(12) United States Patent
Naqvi et al.

(10) Patent No.: US 10,736,164 B2
(45) Date of Patent: *Aug. 4, 2020

(54) ASSOCIATED DEVICE DISCOVERY IN IMS NETWORKS

(71) Applicant: Aylus Networks, Inc., Westford, MA (US)

(72) Inventors: Shamim A. Naqvi, Morristown, NJ (US); Prasad S. Dorbala, Lexington, MA (US); Ellis L. Wong, Lexington, MA (US); Mahesh N. Ganmukhi, Carlisle, MA (US)

(73) Assignee: AYLUS NETWORKS, INC., Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/681,283

(22) Filed: Nov. 12, 2019

(65) Prior Publication Data

US 2020/0084816 A1 Mar. 12, 2020

Related U.S. Application Data

(63) Continuation of application No. 16/140,672, filed on Sep. 25, 2018, now Pat. No. 10,477,605, which is a (Continued)

(51) Int. Cl.
*H04W 4/00* (2018.01)
*H04W 76/15* (2018.01)
(Continued)

(52) U.S. Cl.
CPC ............ *H04W 76/15* (2018.02); *H04H 20/38* (2013.01); *H04L 65/1016* (2013.01);
(Continued)

(58) Field of Classification Search
CPC ....... H04W 4/00; H04W 40/18; H04W 40/02; H04W 84/18; H04W 84/20
See application file for complete search history.

(56) References Cited

U.S. PATENT DOCUMENTS 6,675,196 B1 * 1/2004 Kronz ..................... H04L 67/16 709/200
7,039,033 B2 * 5/2006 Haller ................. H04L 67/2876
(Continued)

*Primary Examiner* — Shantell L Heiber
(74) *Attorney, Agent, or Firm* — Stuart H. Mayer; Mayer & Williams PC

(57) ABSTRACT

A method of associating multiple user endpoints (UEs) with a single IMS session in an IMS network having a serving node for controlling at least one IMS session for a user and at least a first access network for providing access to UEs. The method involves associating a first UE with the user and with an IMS session; discovering a second UE in a proximity of the first UE; discovering information about the second UE; communicating the information about the second UE to the serving node; the serving node utilizing computer-implemented policy logic to determine whether to associate the second UE with the user and the EMS session; and if the policy logic determines that the second UE is to be associated, the serving node associating the second UE with the IMS session while retaining the association with the first UE.

20 Claims, 17 Drawing Sheets

Related U.S. Application Data continuation of application No. 15/210,263, filed on Jul. 14, 2016, now Pat. No. 10,085,291, which is a continuation of application No. 13/276,744, filed on Oct. 19, 2011, now Pat. No. 9,468,033, which is a continuation of application No. 11/370,594, filed on Mar. 8, 2006, now abandoned, which is a continuation of application No. 11/282,924, filed on Nov. 18, 2005, now abandoned, and a continuation-in-part of application No. 11/166,407, filed on Jun. 24, 2005, now Pat. No. 7,792,528.

(51) Int. Cl.

| | | |
|---|---|---|
| *H04M 7/12* | (2006.01) | |
| *H04W 48/18* | (2009.01) | |
| *H04W 80/10* | (2009.01) | |
| *H04L 29/06* | (2006.01) | |
| *H04L 29/08* | (2006.01) | |
| *H04W 4/80* | (2018.01) | |
| *H04W 48/16* | (2009.01) | |
| *H04H 20/38* | (2008.01) | |
| *H04W 72/04* | (2009.01) | |
| *H04W 8/26* | (2009.01) | |
| *H04W 88/18* | (2009.01) | |
| *H04W 84/04* | (2009.01) | |
| *H04W 84/18* | (2009.01) | |
| *H04W 88/06* | (2009.01) | |
| *H04W 88/04* | (2009.01) | |

(52) U.S. Cl.
CPC .......... *H04L 67/14* (2013.01); *H04L 67/146* (2013.01); *H04L 67/306* (2013.01); *H04M 7/123* (2013.01); *H04W 4/80* (2018.02); *H04W 48/16* (2013.01); *H04W 48/18* (2013.01); *H04W 72/0493* (2013.01); *H04W 80/10* (2013.01); *H04W 4/00* (2013.01); *H04W 8/26* (2013.01); *H04W 84/045* (2013.01); *H04W 84/18* (2013.01); *H04W 88/04* (2013.01); *H04W 88/06* (2013.01); *H04W 88/18* (2013.01)

(56) References Cited

U.S. PATENT DOCUMENTS

| | | | |
|---|---|---|---|
| 7,463,622 B2* | 12/2008 | Lu | H04W 88/06 370/328 |
| 7,689,681 B1* | 3/2010 | David | H04W 4/44 709/223 |
| 2002/0085511 A1* | 7/2002 | Koponen | H04W 88/02 370/315 |
| 2002/0132638 A1* | 9/2002 | Plahte | H04W 88/085 455/555 |
| 2003/0026213 A1* | 2/2003 | Frank | H04W 92/02 370/254 |
| 2004/0028009 A1* | 2/2004 | Dorenbosch | H04W 36/0011 370/329 |
| 2004/0139088 A1* | 7/2004 | Mandato | H04L 47/808 |
| 2004/0196867 A1* | 10/2004 | Ejzak | H04M 7/006 370/468 |
| 2005/0215283 A1* | 9/2005 | Camp, Jr. | H04N 1/00127 455/556.2 |
| 2006/0291433 A1* | 12/2006 | Do | H04L 29/06 370/338 |
| 2006/0291455 A1* | 12/2006 | Katz | H04W 12/0608 370/355 |
| 2008/0205317 A1* | 8/2008 | Piipponen | H04L 41/12 370/311 |

\* cited by examiner

ASSOCIATED DEVICE DISCOVERY IN IMS NETWORKS

CROSS-REFERENCE TO RELATED APPLICATIONS

This application is a continuation of U.S. application Ser. No. 16/140,672, filed Sep. 25, 2018, which is a continuation of and claims priority under 35 U.S.C. 120 of U.S. patent application Ser. No. 13/276,744, filed Oct. 19, 2011, now U.S. patent Ser. No. 10,085,291, issued Sep. 25, 2018, which is a continuation of and claims priority under 35 U.S.C. 120 to U.S. patent application Ser. No. 11/370,594, filed Mar. 8, 2006, entitled Associated Device Discovery in IMS Networks, which is a continuation-in-part of and claims priority under 35 U.S.C. 120 to the following applications, the contents of which are incorporated herein by reference in their entirety:

U.S. patent application Ser. No. 11/166,407, filed on Jun. 24, 2005, entitled Method and System For Provisioning IMS Networks With Virtual Service Organizations Having Distinct Service Logic;

U.S. patent application Ser. No. 11/282,924, filed Nov. 18, 2005, entitled IMS Networks with AVS Sessions with Multiple Access Networks.

This application is related to U.S. patent application entitled "Digital Home Networks Having a Control Point Located on a Wide Area Network" filed on even date herewith.

BACKGROUND

Field of the Invention

The invention generally relates to IP Multimedia Subsystem (IMS) networks and, more specifically, to IMS users that use (perhaps multiple) discovered user endpoint devices.

Discussion of Related Art

Commonly deployed wireless communication networks, usually referred to as 2.5G networks, support both voice and data services. Typically, mobile handsets are connected to a Base Transceiver Station (BTS) using a Radio Access Network (RAN) that uses a modulation scheme such as CDMA (Code Division Multiple Access) or GSM (Global System for Mobile communications). The BTSs are connected via fixed links to one or more Base Station Controllers (BSCs), and the BSCs are aggregated into switches called Mobile Switching Centers (MSCs). The MSC is connected to the Public Land Mobile Network/Public Switched Telephone Network. (PLMN/PSTN), typically through a gateway switch called the Gateway Mobile Switching Center (GMSC). Sometimes the term "core network" is used to collectively describe the MSC, GMSC and associated network elements. Voice traffic uses the so called circuit switched paradigm of communications in which circuits are assigned, i.e., dedicated, to a call for its entire duration; the voice traffic is carried using Time Division Multiplexing (TDM) switching technology. Signaling traffic uses Signaling System 7 (SS7) typically as out of band circuits.

With the advent of Internet Protocol (IP) networking. IP data service is offered to wireless clients by an overlay data network in which a packet control function (PCF) is introduced at the BSC level to connect BSCs to an IP-routed network. The PCF is responsible for packetization of RAN traffic. On the inbound side (core network to RAN) the PCF takes IP packets and reorganizes them for transmission as frames over the radio transport protocol. On the outbound side (RAN to core network) the PCF packetizes radio protocol frames to IP packets. Data connections are handled by this overlay network and the MSC is used primarily to handle circuit switched voice calls.

The development of Voice over IP (VoIP) technology has resulted in the MSC being re-designed to handle packet switched voice traffic along with existing circuit switched traffic. This new architecture is called a soft switch network. The legacy switch is disaggregated into a control and multiplicity of media gateway (MGW) components. The control component (sometimes called the soft switch) uses an open control protocol called the Media Gateway Control Protocol (MGCP) to manage the MGW. The MGW itself has the ability to accept both packet and circuit switched traffic and convert one to the other, under the control of the soft switch. It is thus possible in 2.5G networks to carry both circuit switched and packet switched traffic.

It is widely believed that wireless communications will soon be dominated by multimedia services. This has resulted in new RAN technologies and the resulting networks are called 3G networks. The transition of 2.5G to 3G networks emphasizes packet traffic and new architectures have been proposed to handle multimedia sessions, such as Quality of Service (QoS).

A defining characteristic of 2.5G/3G multimedia services is that since the handset can send or receive IP data packets at any time, the IP context of the handset is maintained as long as the handset is powered on and connected to the network. This is in contrast to traditional telephony where the state of a connection is maintained only while a telephone call is in progress.

In particular, in 3G networks the services are to be provided by so-called Application Servers. Consequently the connection between the service logic and the application server is a "stateful" connection that needs to be maintained for the duration of the service being used. Hence a very large number of stateful connections need to be maintained between the application server complex, hosted in the application domain, and the service logic complex hosted in the service logic domain, in a network servicing a large number of subscribers. Such stateful connections that cross administrative domains have high networking costs and are difficult to maintain operationally.

Typical of proposals for 3G network architecture is the IP Multimedia Subsystem (IMS) architecture, shown in FIG. 1. IMS is independent of the type of access network; that is, it applies both to wireless and landline networks. Examples of access networks include various flavors of Wi-Fi networks, GPRS, and HSDPA networks. IMS uses Session Initiation Protocol (SIP) for control and signaling messages. SIP is an IP-based signaling protocol designed for multimedia communications. The IMS architecture introduces several control functions, i.e., functional entities, to manage the network. The legacy circuit-switched traffic is handled by an Inter-working Function called the BGCF (Breakout gateway control function). The MGW is controlled by a new function called the Media Gateway Control Function (MGCF), and the media processing functions are performed by the Media Resource Function Processor (MRFP), which is controlled by the Media Resource Control Function (MRCF).

The basic call server called the Call State Control Function (CSCF) is logically partitioned into three functional entities, the Proxy, Interrogating and Serving CSCF.

The Proxy Call State Control Function (P-CSCF) is the first contact point for the handset, also referred to herein as the User Entity (UE) within IMS and provides the following functions:
1. Forward SIP register request received from the UE
2. Forward SIP messages received from the UE to the SIP server
3. Forward the SIP request or response to the UE
4. Detect and handle an emergency session establishment request
5. Generate Call Detail Records (CDRs)
6. Maintain Security Association between itself and each UE
7. Perform SIP message compression/decompression
8. Authorize bearer resources and QoS management The Interrogating CSCF (I-CSCF) is mainly the contact point within an operator's network for all IMS connections destined to a subscriber of that network operator, or a roaming subscriber currently located within that network operator's service area. It provides the following functions:
1. Assign a S-CSCF to a user performing SIP registration
2. Route a SIP request received from another network towards the S-CSCF
3. Obtain from Home Subscriber Server (HSS) the Address of the S-CSCF
4. Forward the SIP request or response to the S-CSCF as determined above
5. Generate Call Detail Records The Serving CSCF (S-CSCF) actually handles the session states in the network and provides the following functions:
1. Behave as SIP Registrar: accept registration requests and make its information available through the location server
2. Session control for the registered endpoints' sessions
3. Behave as a SIP Proxy Server: accept requests and service them internally or forward them on
4. Behave as a SIP User Agent: terminate and independently generate SIP transactions
5. Interact with application servers for the support of Services via the IMS Service Control (ISC) interface
6. Provide endpoints with service event related information
7. Forward SIP message to the correct CSCF
8. Forward the SIP request or response to a BGCF for call routing to the PSTN or CS Domain
9. Generate Call Detail Records The P-CSCF is the first point of contact for a UE (handset) in an IMS network. The I-CSCF then helps in establishing which S-CSCF "owns" the UE.

FIG. 2 is a signaling diagram, showing the call flow for a UE when it first establishes contact with an IMS network. The UE sends a "register" request to the proxy (201, 202). Assuming the proxy determines that the UE is registering from a visiting domain, it queries the DNS to find the I-CSCF in the UE's home domain (203). The proxy then sends the registration information to the I-CSCF (204). The HSS checks if the user is already registered and sends the address of the S-CSCF in response (205, 206). An authentication process now ensues in which the UE is challenged to provide valid authentication vectors (207-211). Once the authentication procedure is completed (212-218), the S-CSCF informs the HSS that the UE is registered (219-225).

The HSS provides initial filter codes (IFCs) to the S-CSCF. The IFC, in effect, maps the service codes with various application servers (ASs). Thus, if the UE later issues a service request or if the service is otherwise triggered the mapped AS will be invoked. The IFC is effectively the "call model" for the UE. These call models are static objects downloaded during registration from the HSS. Every UE in the domain of the S-CSCF will, if they have the services enabled at all, have the same application servers (ASs) mapped to the same services. For example, push-to-talk service for each and every UE having such service will point to the same AS or point to an AS with identical service logic to provide the identical push-to-talk functionality.

Registered UEs may use services by initiating a new session establishment procedure depicted in FIG. 3. The Figure shows a session establishment request originating with a S-CSCF (called O-SCSCF) or I-CSCF (called O-IC-SCF). This request is muted to the "terminating" S-CSCF (T-SCSCF), which consults the callee's service profile (301). Based on the service profile of the originating registered user, the T-SCSCF sends an IMS service control request (ISC) to the corresponding application server (T-AS) that can handle this service request (302). The T-AS provides the service to the callee and terminates the session (303) and the S-CSCF terminates the application activation process (304).

As an illustrative example, consider the case of voice mail in which callers to a certain user may leave a voice message if the called user does not respond to the call. This voice mail service is provided by an application server (AS) dedicated to this service and having service logic to provide such functionality. The S-CSCF transfers control to the voice mail application server when a certain service point trigger (SPT) occurs, i.e., an event occurs that causes a trigger within the SPT to "fire." The IFCs that provide trigger points to the service logic of the S-CSCF are downloaded into the S-CSCF during user registration at session initiation time and remain fixed for the duration of the session. The service profile described above that is consulted by the T-SCSCF is a static object in the sense that the information contained in it is defined once at the time of service inception.

The coverage area of a service provider is typically partitioned into geographical regions called cells. Each cell is served by a BTS, i.e., the BTS radiates energy within a cell. Allocating frequencies to cells in a judicious manner allows re-use of frequencies and, hence, to more efficient use of the operator's spectrum allocation. As a mobile handset roams across cell boundaries, its reception of the signal being radiated by the BTS varies. A crucial component of wireless communication networks is the ability to hand off a moving handset from one BTS to a neighboring BTS. Various handoff algorithms are known in the literature. Broadly speaking, all handoff technologies fall into one of two types: hard handoff, and soft handoff.

In hard handoffs the connection between the current BTS and the handset is severed and a new connection is established between a new BTS and the handset while a telephone call is ongoing. The decision to sever the old connection and start a new connection is based on a pre-determined threshold value of the received signal. In soft handoff technologies the signal strength from two (or more) BTS are compared and the one that has the higher value is selected. The main advantage that handoffs provide is that ongoing calls remain connected as the handset roams in the coverage area. Since the region in which a BTS radiates is limited, a handset that roams out of the range of a BTS will lose connection with the BTS and hence any ongoing call will be dropped. Handoffs ensure that the handset remains connected to some BTS and any ongoing calls do not get dropped.

As the bandwidth provided by wireless networks increases, it is now possible to send and receive multimedia information to handsets. Thus, handsets are no longer used only to make and receive telephone calls. Rather handsets are envisioned to send and receive multimedia information such as video clips, audio files, etc. Handsets have become general purpose computing and communication devices. Wireless networks are now expected to provide broadcast content, video telephony, multimedia conferencing, video streaming services, file upload and download services, and interactive multimedia services.

However, the availability of network coverage supporting multimedia services is highly uneven. In some areas several networks may be available simultaneously that could be used by a handset, whereas in other regions there may be insufficient coverage to support a given network service. For example, at a given location one may have several short-range Wi-Fi or WiMax networks, or 1×RTT EVDO, that could provide multimedia services to a handset (assuming that the handset is capable of supporting multiple modulation schemes).

A handset, however, has an inherent disadvantage since its form factor is generally not suitable for long term use as a display device. The small size of the handset display screen is not amenable to long duration sessions or sessions in which the handset is jointly viewed by several users. In such cases it would be desirable to view the multimedia services on a larger LCD or a TV display device. Many such devices support LAN connections directly or indirectly via commercially available media plugs. Moreover, such devices may also support short range wireless networks such as Wi-Fi and WiMax.

The wireless world is increasingly becoming a world of multiple networks. Some are short range and others support longer ranges of coverage. The information-carrying capacity of these networks varies widely from network to network. Handsets increasingly support multiple wireless connections, including both short range networks such as Bluetooth and Wi-Fi, and long range cellular networks.

SUMMARY

The invention provides systems and methods for device discovery in IMS networks. Following discovery, the discovered device communicates information about its capabilities and network connectivity to the handset, which then relays this to a serving node that controls the IMS session in which the handset is participating. The serving node executes logic based on a set of policies to determine whether to associated the discovered device into the IMS session. If a positive determination is made, the serving node associates the discovered device with the IMS session and with the user of the handset. It then causes at least some of the IMS session content to be directed to the discovered device, while retaining the handset within the IMS session.

In general, in one aspect, the invention features a method of associating multiple user endpoints with a single IMS session in an IMS network having a serving node for controlling at least one IMS session for a user and at least a first access network for providing access to UEs. The method involves: associating a first UE with the user and with an IMS session; discovering a second UE in a proximity of the first UE; discovering information about the second UE; communicating the information about the second UE to the serving node; the serving node utilizing computer-implemented policy logic to determine whether to associate the second UE with the user and the IMS session; and if to be associated, the serving node associating the second UE with the IMS session while retaining the association with the first UE.

Other aspects include one or more of the following features. The method further includes the serving node causing an application server to utilize the second UE within the IMS session. The serving node causes the application server to utilize the second UE via the first access network and the first UE. The application server is a media server associated with the IMS session, and the media server transmits real-time streaming media to the first UE; and the first UE relays the real-time streaming media to the second UE. The serving node determines that the second UE is to be associated with the user, obtains a network address of the second UE and establishes an alternative network via a second access network connection to the second UE that does not involve the first UE. The application server utilizes the second UE by transmitting content to the second UE via the alternative network connection. The application server is a media server associated with the IMS session, and the media server transmits real-time streaming media to the second UE via the alternative network connection. After the serving node has associated the second UE with the IMS session, an application server under control of the IMS session utilizes the first and second UEs concurrently within the IMS session. The second UE is discovered as a result of a search message broadcast by the first LIE or an advertising message transmitted from the second UE. The second UE is discovered by at least one of the Universal Plug and Play, Jini, RFID, and Bluetooth discovery mechanisms. The serving node determines that the content to be delivered to the second UE requires trans-coding and the serving node directs a media resource control function to establish a trans-coding session. The media resource control function transmits trans-coded real-time streaming content to the first UE for relay to the second UE. The serving node determines that the content to be delivered to the second UE requires trans-coding and directs a media resource control function to establish a trans-coding session, and the media resource control function transmits real-time streaming content to the second UE via the alternative network connection. The trans-coding alters at least one of the color resolution and the spatial resolution of the content to be delivered. The determination whether to associate the second UE with the user and the IMS session is based in part on user choice. The computer-implemented policy logic that determine whether to associate the second UE with the user and the IMS session includes rules that depend on at least one of: (i) a business relationship between the user and a provider of telecommunication services; (ii) a business relationship between the user and an owner or operator of the second UE device; and (iii) a technical specification of the second UE. The serving node associates the second UE with the IMS session and the serving node later terminates the association of the second UE with the IMS session. The termination of the association with the second UE is triggered by the second UE becoming unavailable or by the second UE leaving the proximity of the first UE, the serving node maintaining session continuity with the first UE.

DETAILED DESCRIPTION

Preferred embodiments of the invention permit IMS user sessions to utilize devices that are discovered by the UE during the course of an IMS session. The embodiments provide for the discovery of available devices, and for choosing whether to add a discovered device to the IMS session. The choice can be made to depend on physical and/or technical factors, such as whether the IMS session involves the use of content that could benefit from the incorporation of the associated device into the IMS session. For example, if the user is receiving video, and a large-screen TV set is discovered, it would be beneficial for the user to view the video on the large screen of the discovered TV set rather than on the small screen of a handset. In addition, the decision to include the discovered device can be made to depend on a set of policies that involve business relationships (such as of the user to owner/operator of the available devices) and cost. The described embodiments allow the signaling channel to remain intact (i.e., it is not generally handed over to an associated device) allowing for a consistent service experience (i.e., the application logic can remain in the domain of the original service provider).

Figure 4:
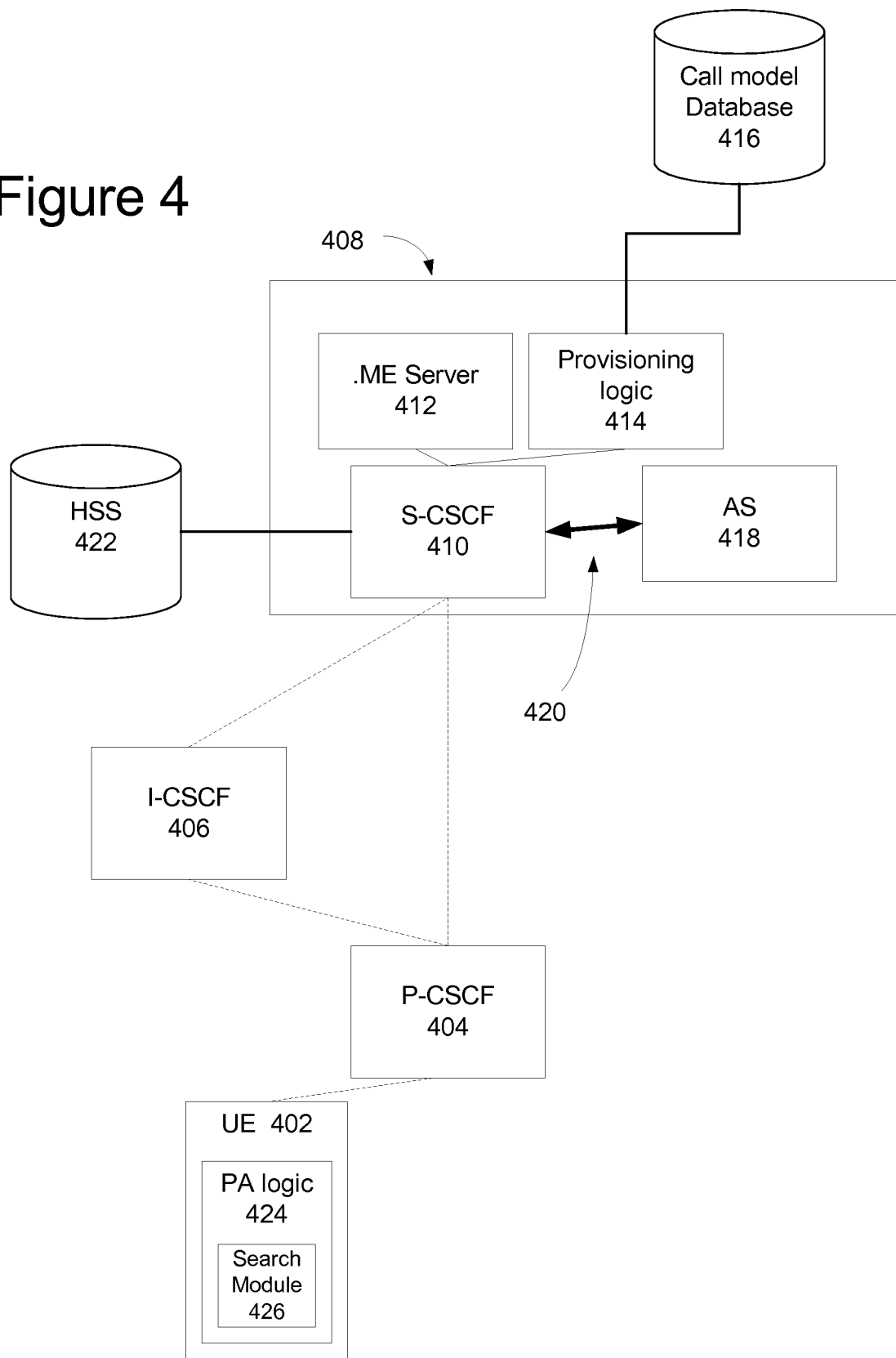
FIG. 4 is a block diagram showing the principal elements of the described method.

FIG. 4 depicts relevant portions of an IMS network according to preferred embodiments of the invention. The relevant portions include UE 402, P-CSCF 404, I-CSCF 406, serving node 408, HSS 422, and call model database 416.

The UE, P-CSCF 404, I-CSCF 406, and HSS are essentially conventional, though the content of HSS 422 is not, as described below. However, in certain embodiments, the UE may have unconventional agent logic, namely PA logic 424, and search module 426, each of which is discussed in more detail below. All of these entities communicate using known and defined protocols.

Serving node 408, in preferred embodiments, includes S-CSCF logic 410 that is largely conventional though it includes certain modifications, discussed below. Serving node 408 also includes ME server logic 412 (more below) to store users' dynamic network topologies and other information, and provisioning logic 414 more below. (Alternatively, the ME server logic and the provisioning logic may each be a separate physical entity like an AS.) The ME server and provisioning logic essentially are co-located special purpose servers within node 408. The serving node 408, and particularly provisioning logic 414, communicates with a call model database 416. This database 416 (not the HSS as is the conventional case) is used to provide the call model information for a given user (more below).

Though not shown in FIG. 4, serving node 408 communicates with application servers (ASs) that include service logic for various services, e.g., voice mail, push-to-talk, etc. The UEs use predefined codes within service requests to identify the service of interest and/or these services can be triggered in known specified ways via SPTs (as is the conventional case).

Figure 5:
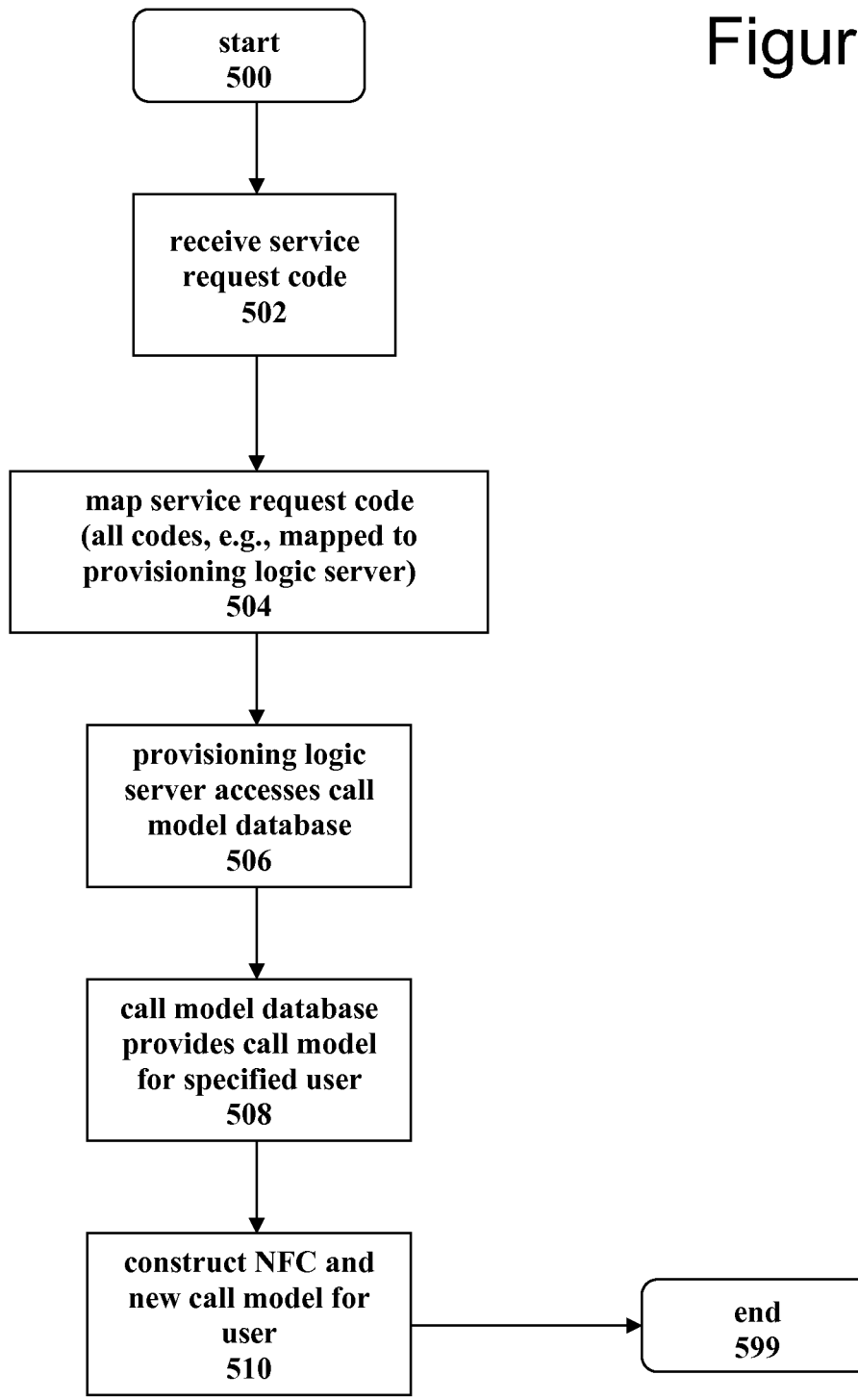
FIG. 5 depicts logic for providing per user (or group) call models.

FIG. 5 depicts the logic flow for provisioning a S-CSCF with distinct call models for each user. Under preferred embodiments, the HSS provides initial filter codes (IFC) during UE registration (as is the conventional case). However, under certain embodiments of the invention, this IFC is programmed in an unusual way. All the service point triggers (SPTs) for each service are mapped to provisioning logic 414 (i.e., not to ASs corresponding to the actual service codes as is the conventional case.)

The logic flow starts in 500 and proceeds to 502 in which the first service request is received after registration. Because of the default IFC, this service request will not trigger an AS corresponding to that service, and instead will trigger activation 504 of the provisioning logic 414. The provisioning logic 414 will then access 506 the call model database 416. One of the input parameters will identify the user. The call model database 416 will retrieve a call model for that particular user. This call model will include the AS identifiers for the various services for that user. The database 416 will provide 508 the call model information to the provisioning logic 414 which in turn will provide it to the S-CSCF logic 410 within serving node 408. The S-CSCF 410 will construct a new set of filter codes, i.e., NFC, and thus a new call model, for that user (and will trigger the service requested initially using the NFC). The NFC will have SPTs identifying the corresponding ASs. This approach allows for dynamic construction of the NFCs (e.g., post registration) and allows the call model (e.g., NFC with associated SPTs) to be constructed uniquely for each user.

The above logic allows each user to have a call model and NFC that can differ from all other call models served by that S-CSCF. This functionality may be used in many ways. Per-user differentiated call models is useful though not strictly necessary to practice preferred embodiments of the invention.

This form of per user call model customization, in which different users may invoke different service logic functionality for the same given service request, is not provided in a conventional IMS network. In conventional IMS arrangements, the HSS provides static call models at UE registration. Each user gets the same ASs within their IFC and thus the same service experience (for services they are authorized to use). Moreover, the above approach allows for full portability of call models. No matter where a UE exists in the IMS network, that UE's call model may be constructed and used for that UE's service experience.

Figure 6:
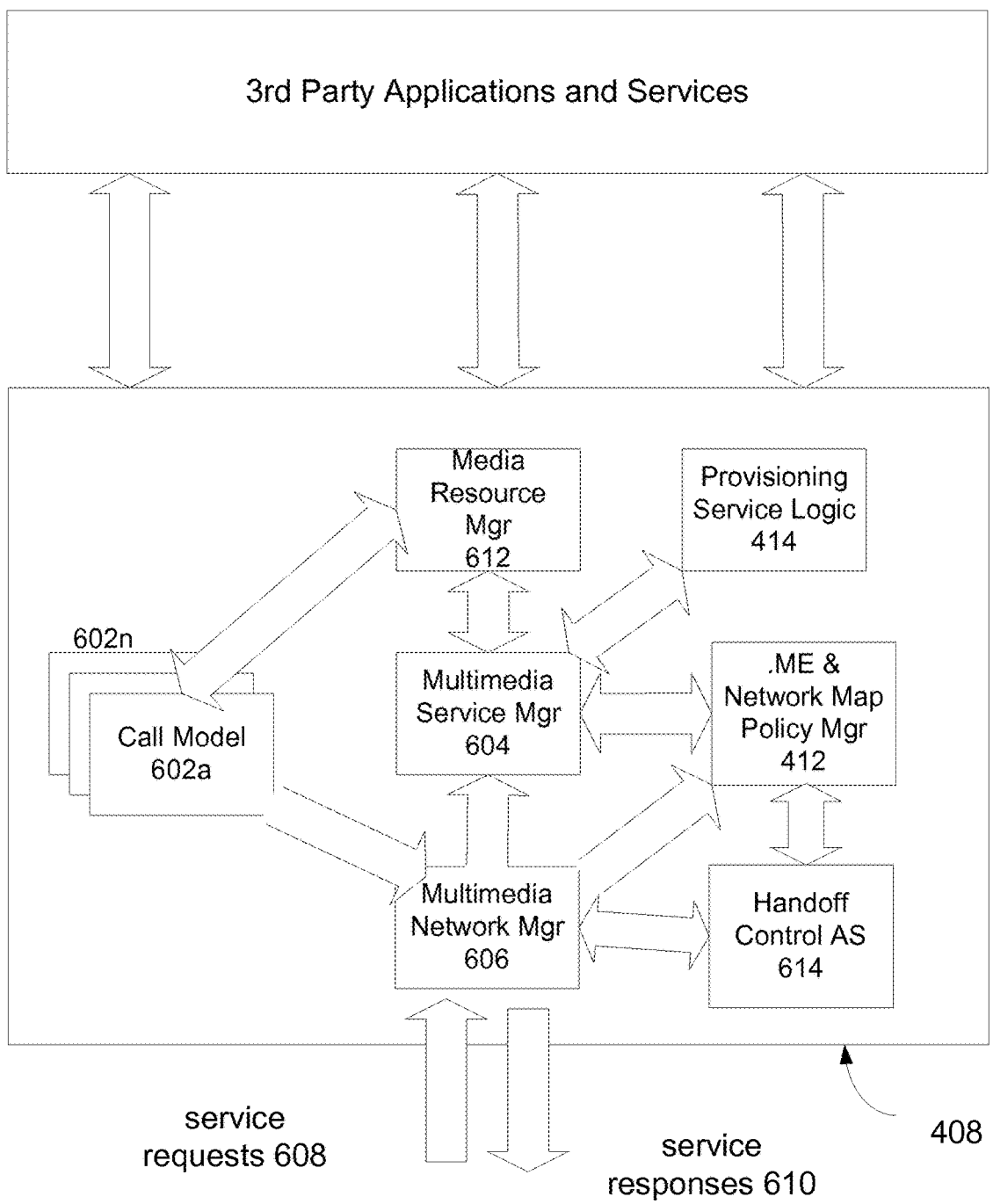
FIG. 6 depicts internal architecture of a certain embodiment of the invention.

FIG. 6 depicts serving node 408 once multiple users have registered and been provisioned with their corresponding call models 602a . . . n. Note, the different call models can point to different ASs for a given service, and they are not merely multiple instances of the same IFC/call model. Multimedia network manager 606 receives service requests 608 from the IMS network and provides service responses 610 to the IMS network. It also routes received requests to the appropriate internal entities as shown. ME server logic and Network Map policy manager 412 are responsible for receiving information (more below) indicating that the user's UE environment has changed with new capabilities or devices, and for building information structures and models to reflect these capabilities. In certain embodiments it also includes logic to implement specified policies on whether and how to utilize such capabilities. Provisioned Service logic 414 is responsible for interacting with external or internal databases (e.g., database 416 of FIG. 4). Media resource manager 612 is responsible for managing other resources (e.g., transcoders) that may be involved with a given service. Multimedia service manager 604 is responsible for receiving requests from network manager 606 and for interacting with the other components to construct and build the per-user call model 602. In simple cases this may involve creating call models with the help of the provisioning logic 414 and call model database 416. In other cases the call model construction will be dynamic (more below) using new devices and capabilities (as well as associated policies), and in these instances the manager 604 will involve ME logic 412, media resource manager 612 as well as handoff control application server 614.

The term handoff as used herein denotes the transfer of a service delivery from one network and/or device to another network and/or device. The handoff does not involve the dropping of an access network connection. This meaning contrasts with the meaning of the term that often appears in the prior art (referred to in the background section above), in which handoff means the dropping of a first connection in favor of a second connection based on the relative signal strengths of the two connections.

The context of an end user may change. For example, as a user roams, his or her context may change. Alternatively, even in non-roaming situations, the user context may change as new devices and capabilities emerge or become activated.

At any given moment, the user may be in close proximity to any number of devices that are capable of acting as a UE for a certain service (application). For example, the user may be near a TV that could be used to display multimedia content. Or the user may be in close proximity to a personal computer that could be used to receive multimedia information from a network connection, provided network connectivity and authorization to use such a device in this manner could be obtained.

The described methods allow a roaming user to discover (directly or indirectly) several kinds of information and invoke several kinds of corresponding relevant policies to consider when and how to use such capabilities and devices;
1. New endpoint devices (UEs or UE devices) that could be used to receive multimedia information;
2. New network connections that terminate and emanate from the UE devices;
3. New device capabilities;
4. Policies that govern use of newly discovered devices and new network connections; and
5. Policies that are implemented by the service provider that control what devices could be used for which type of services under what sort of conditions.

Policies may reside either in the UE or in a designated server in the network. In a preferred embodiment, the policies reside in the network.

An increasing number of mobile handsets support short-range wireless technologies such as Bluetooth and Wi-Fi. According to certain embodiments, a "dynamic profile" is constructed, in part, by logic that executes in the handset. This logic may be executed continuously, periodically at some network determined time interval, or on demand when the user requests a particular service. When executed, the logic senses (or otherwise discovers) the presence of associated devices in the immediate vicinity of the handset using a short-range wireless technology such as Wi-Fi.

Home and personal networking systems increasingly feature the ability to discover new devices using so-called discovery protocols. One such example is the Universal Plug and Play (UPnP) protocol that allows the dynamic discovery of devices. According to certain embodiments, dynamic device discovery and service discovery framework within a user's personal or home area network is performed. For example, UPnP may be used to create a dynamic profile of the immediate environment of the handset (i.e., user) service environment. The dynamic device discovery mechanism is used to help create a personalized user area network map, which will serve as input to the switching/delivery logic.

Associated devices may announce their presence by a variety of means such as but not limited to Universal Plug and Play Devices (UPnP), Jini discoverable devices, RFID devices, and Bluetooth enabled devices.

Any method of broadcasting the capability of devices can be used. The sensing logic in the handset receives such broadcast information and assembles it to construct a dynamic profile of the user's immediate context. Since this context changes as the user roams, the dynamic profile changes to reflect the current vicinity of the handset. The dynamic profile is communicated to the serving node 408. For example, this information may be communicated as parameters (e.g., by overloading information elements [IEs] of Session Description Protocol (SDP) messages) in conjunction with a special service request dedicated to communicating potential UE devices.

A personal agent (PA) having PA logic 424 executes in UE (handset) 402 and includes the sensing logic to discover such other potential UEs or associated devices (more below). The dynamic profile of the user's immediate environment is communicated to the ME logic 412. This is done by having the ME server invoked in response to the special service request from the UE for communicating such discovered devices and capabilities. The ME service will construct topologies and maps to identify the potential UEs, other networks, etc., to reflect the new devices and capabilities discovered or sensed in the UE's vicinity that could potentially be used by a given user.

In certain embodiments, the handset's User Agent profile (UAProf) or Composite Capabilities/Preference Profiles (CC/PP) representing device capabilities and user preferences is used to personalize the multimedia service delivery framework. Serving node 408 will gather the UAProf or CC/PP from the endpoint devices to guide control of not only the rendering and trans-coding of content to be delivered to that device, but also the generation of the call agent as well as the decision to execute that service agent within the network or at the endpoint.

The personal agent supports an automated network and service discovery mechanism, such as the industry standard Universal Plug and Play (UpnP) framework, to establish association with and control of those networked devices.

The networked devices that the PA can be associated with through the discovery procedure can be connected to the mobile handset via wireless connectivity, such as Bluetooth, Jini, self-identifying label technologies such as RFID, or Wi-Fi, or via wired connectivity, such as USB or IEEE 1394 links.

In certain embodiments, the static user profile downloaded by the HSS into the S-CSCF at registration time is provisioned by the network operator to contain the address of the ME server. Thus, every communication of the dynamic profile originating from the UE and received by the S-CSCF causes a SPT trigger to fire, and control is transferred to the corresponding ME server. In this fashion the serving node 408 and more particularly the ME server 412 becomes aware of the immediate context of the UE (handset).

Once the ME server has the information in the dynamic profile, it consults a database of policies described by the service operator. These policy descriptions may be co-located with the ME logic and even the S-CSCF logic (see, e.g., FIG. 6). These policies prescribe certain actions that depend on the data contained in the dynamic profile. For example, a policy can require that if the UE sensing logic discovers a Wi-Fi connection in its immediate vicinity, then this discovered network should be used for originating session requests. Specific logic associated with this policy is then executed to send directions to the PA to enforce this directive at the UE level. When evoked, the policy decision only changes the behavior of those UEs that come under the control of a particular Mobile Virtual Network Operator (MVNO) (A MVNO is an operator that use the radio spectrum license-holder's underlying network facilities to offer services to the consumer. MVNOs do not typically own network infrastructure or spectrum license). Another MVNO may, in general, have a completely different set of policies. Policies may not only be specified by the MVNO but also by end users, provided the network interfaces allow the users to specify actions that should be taken when certain events and situations are discovered in the UE's environment. Such user specified policies may over-ride policies specified by the MVNO.

Figure 7:
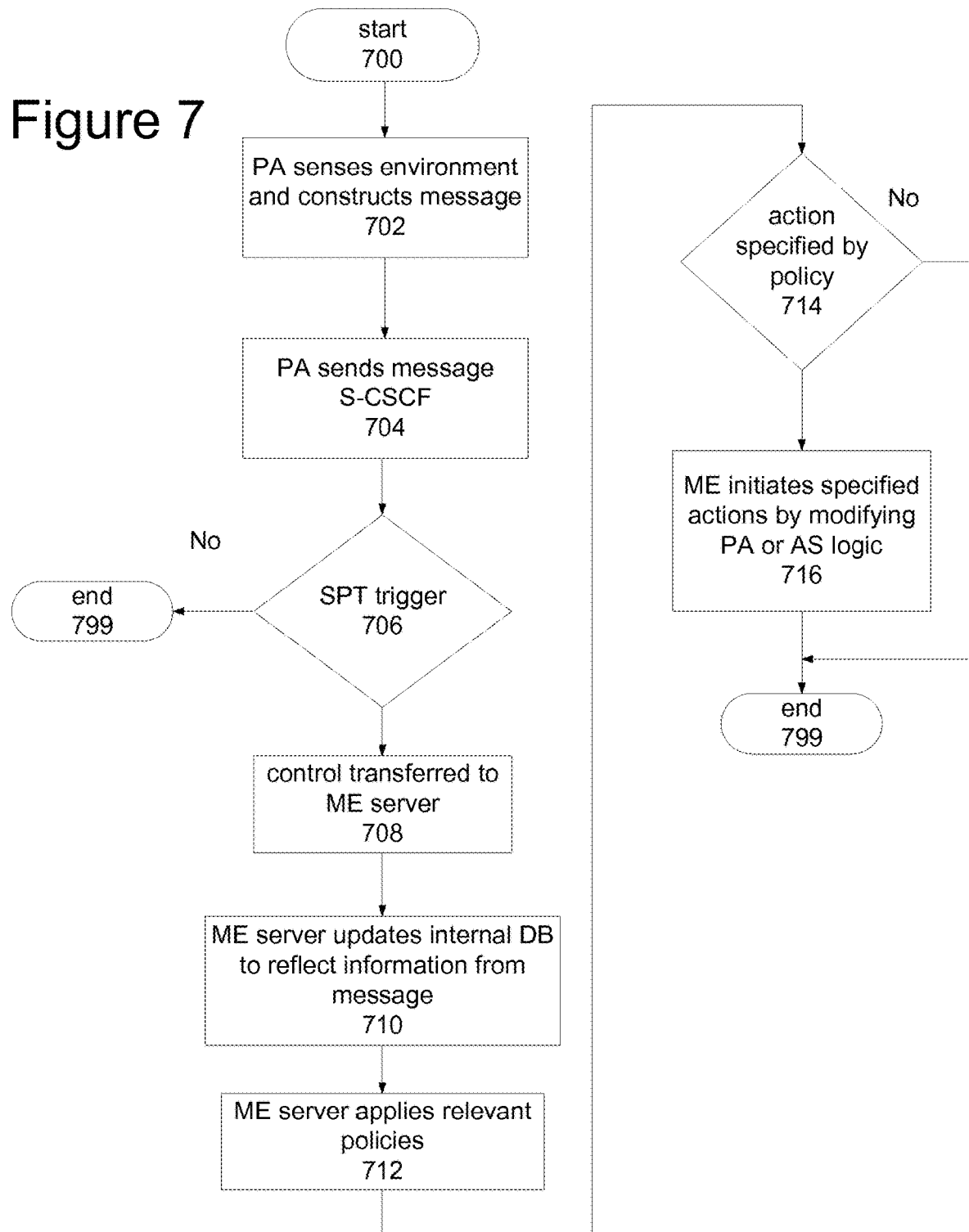
FIG. 7 depicts logic for providing dynamic call models.

FIG. 7 is a flow diagram illustrating the customization of service logic. The logic starts in step 700 and proceeds to step 702 in which the PA logic 424 on the UE discovers or senses its immediate environment or context and constructs a message specifying this dynamic context. This message may include information about, new devices that could be used to receive multimedia information, new network connections that terminate and emanate from such devices, and new device capabilities. The PA on the UE sends the message to S-CSCF (704) and the message either causes an SPT trigger or it does not, depending on how the IFC or NFC is constructed (706). If the message is triggering event, the logic proceeds to step 708 in which control is transferred to the ME server; otherwise the logic terminates (799). The ME server updates its internal database to reflect the information communicated in the message from the PA in the UE (710). The ME server then applies any relevant policies that will determine, for example, whether and how to utilize newly discovered devices and capabilities (712), and the logic determines whether any action is specified by the policy (714). If so, the specified action is initiated (716). This can be done by customizing the PA logic 424 on the UE or by customizing the AS logic. For example, in a typical embodiment, S-CSCF logic 410 will be modified to initiate or trigger the specified actions after the ME logic has updated its models accordingly and perhaps after a new dynamic call model is instructed for that particular user to reflect new devices and capabilities.

In an alternative embodiment S-CSCF logic 410 is not hosted within a serving node 408 as shown in FIG. 4; that is, the S-CSCF 410 is not constrained to be hosted by the MVNO domain. In this embodiment the S-CSCF remains hosted in the IMS serving domain of the network operator and is a separate entity, as in a conventional IMS network, and the ME server and provisioning logic are configured as ASs, though, as explained above, they do not provide conventional IMS services and instead are used in the construction of dynamic call models.

Figure 8:
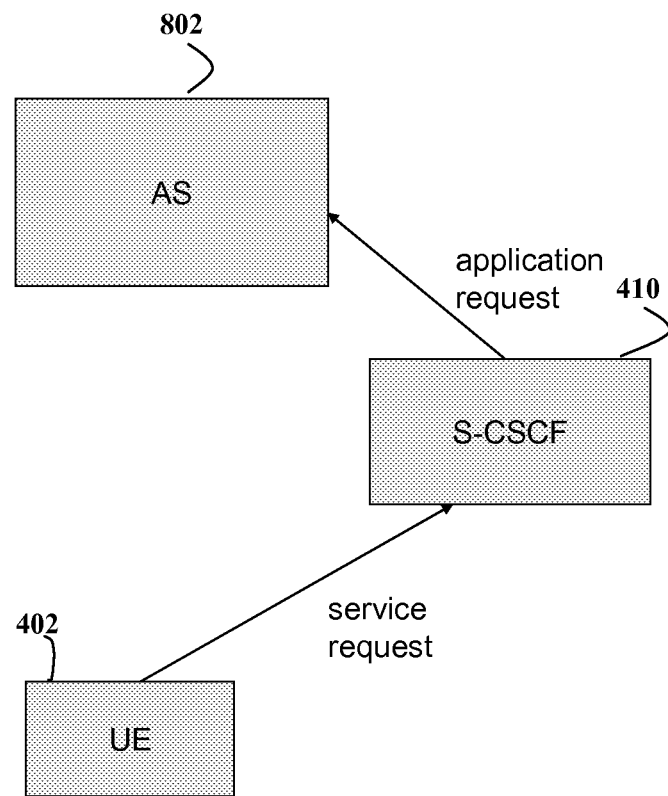
FIG. 8 is a simplified network diagram to illustrate the interaction between a UE, a CSCF and an application server.

The interactions between the CSCF and an AS are summarized in FIG. 8. As outlined above, in IMS networks, all services are provided by application servers (ASs). In FIG. 8, the network is simplified (for descriptive purposes) to show only one AS 802, but in practice there will be multiple ASs. Service requests are sent (directly or indirectly) from a UE 402 (see also FIG. 4) to a S-CSCF 410 (see also FIG. 4). The S-CSCF uses its internal call model (see, e.g., 602 of FIG. 6) to invoke a corresponding application server.

Figure 9:
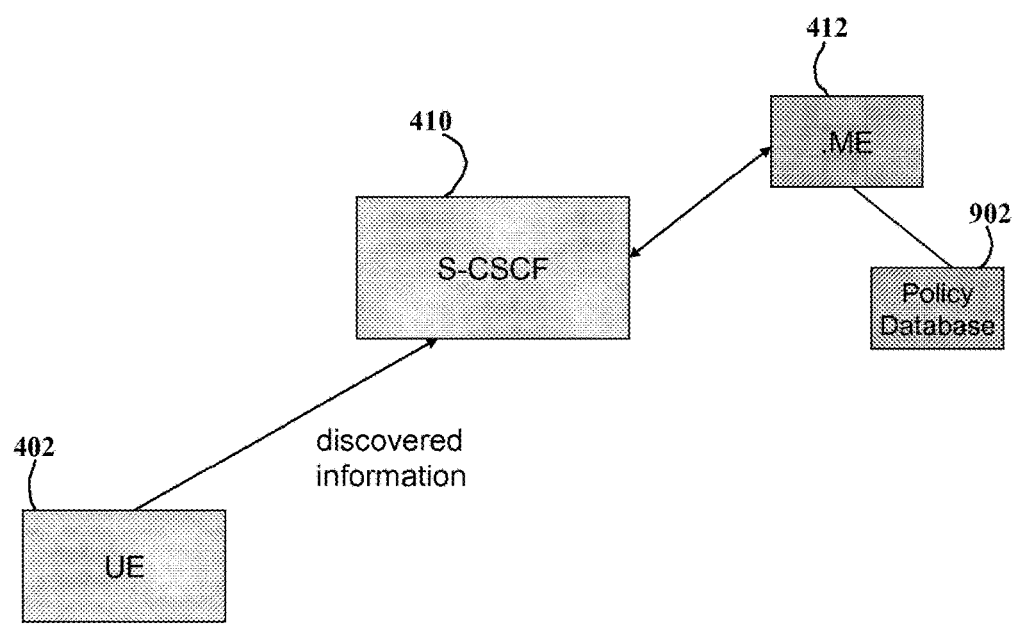
FIG. 9 is a simplified network diagram to illustrate the interaction between a UE, a CSCF, a dynamic network topology database (or ME database) and policy database.

In preferred embodiments, the call model 602 (FIG. 6) (i.e., state machine) executing in the S-CSCF 410 for this UE is modified to take into consideration the newly discovered devices and network connections as described herein. This newly discovered information is stored in the ME server 412. The discovery is done by sensing logic resident in the UE and may be communicated to the ME server periodically, or when discovered, or at pre-designated intervals. As discussed above, this communication may be done, for example, by overloading the information elements of the SDP. The interaction between the ME server 412 and the CSCF 410 is shown in FIG. 9. As described above, the CSCF 410 is invoked with messages (or overloaded messages) that include information about discovered devices, network connection, new capabilities, etc. The CSCF 410 then invokes the ME server 412 which in turn consults the policy database 902.

Figure 1:
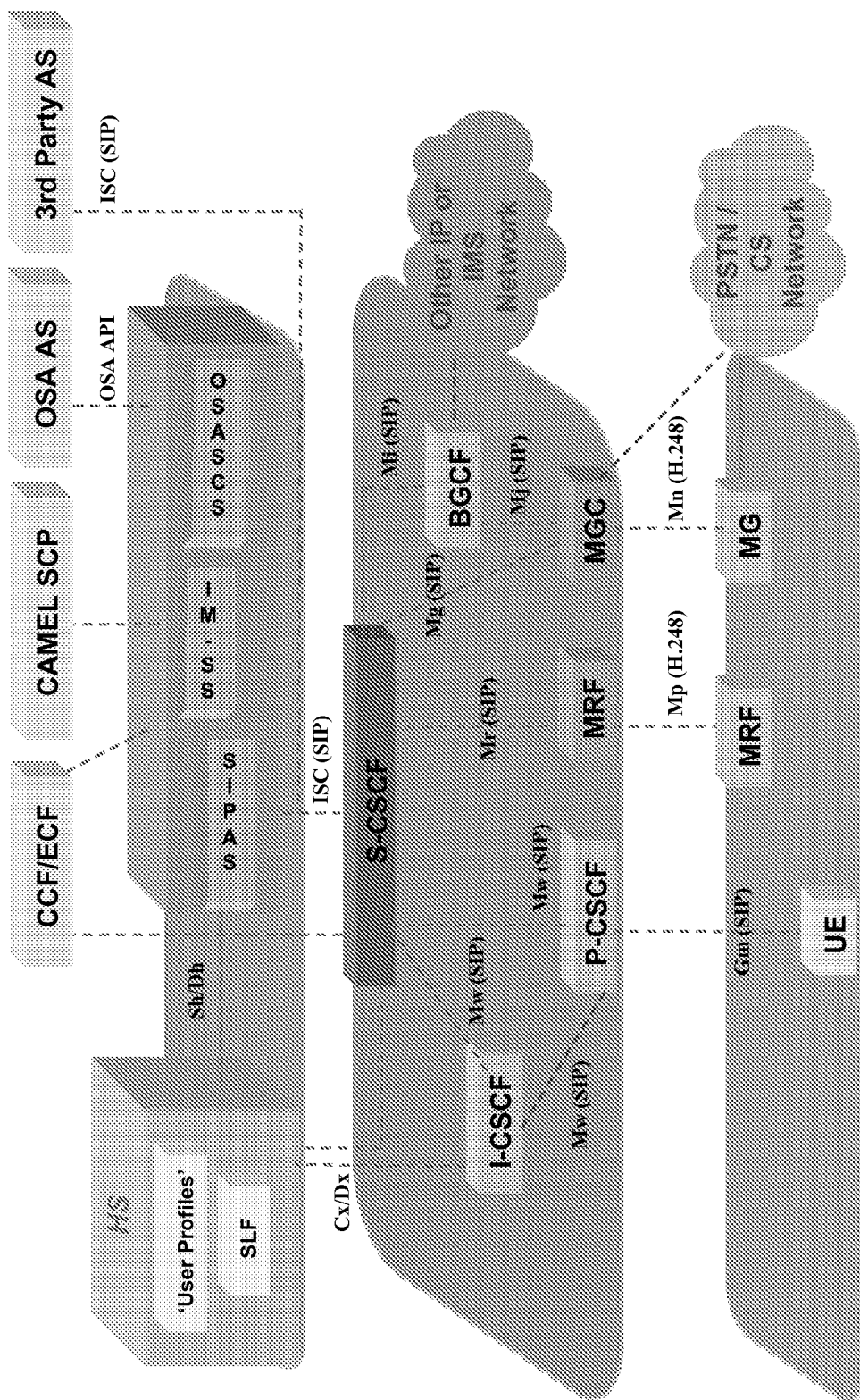
FIG. 1 depicts a prior art IMS network.
Figure 2:
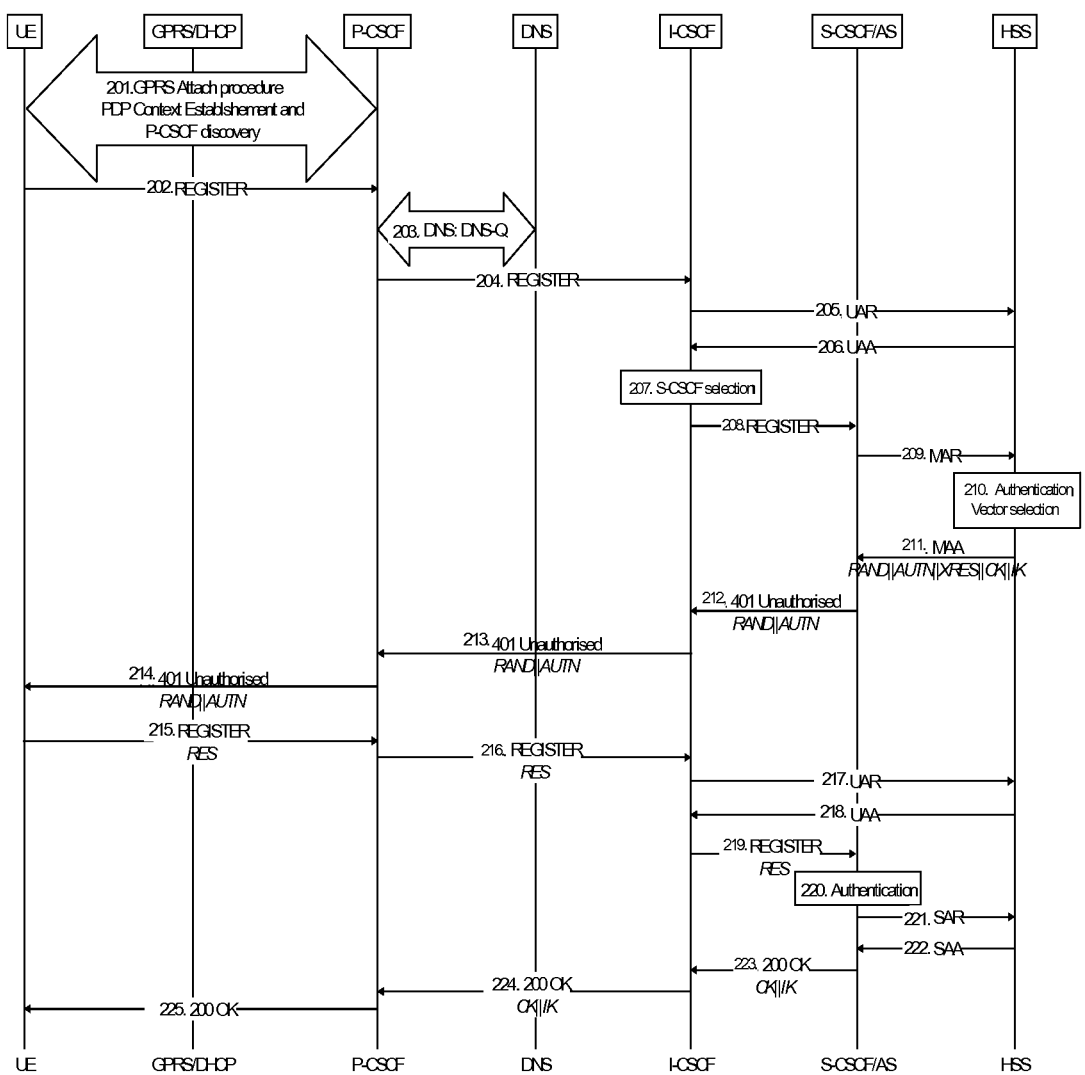
FIGS. 2 and 3 are signal diagrams for a prior art IMS network.
Figure 3:
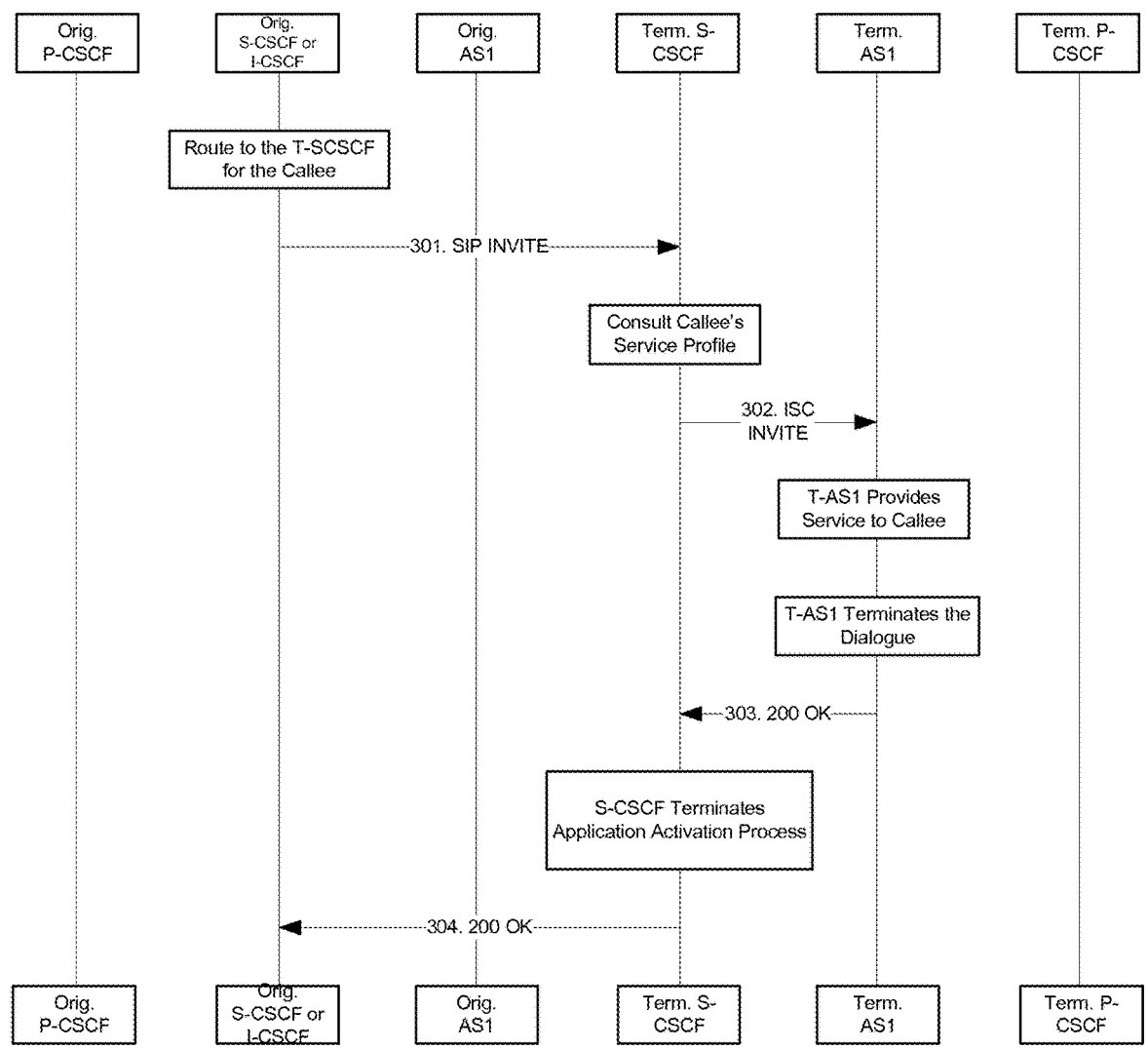

In one scenario, a subscriber wanting to view multimedia content from an Internet server on his handset initiates an IMS request to serving node 408. The request emanates from the UE to the P-CSCF and onwards to the S-CSCF as explained above in connection with FIG. 1. From the S-CSCF it is routed to the ME (acting as an Application server) so as to perform per subscriber customization, as explained in connection with FIG. 4. This request then causes a connection to be made to the serving node 408 (explained in more detail later) and an IMS session is established between serving node 408 and the UE using the access network to which the P-CSCF is attached. This IMS session is uniquely identified by an IMS Charging ID (ICID) assigned by the P-CSCF.

Figure 10:
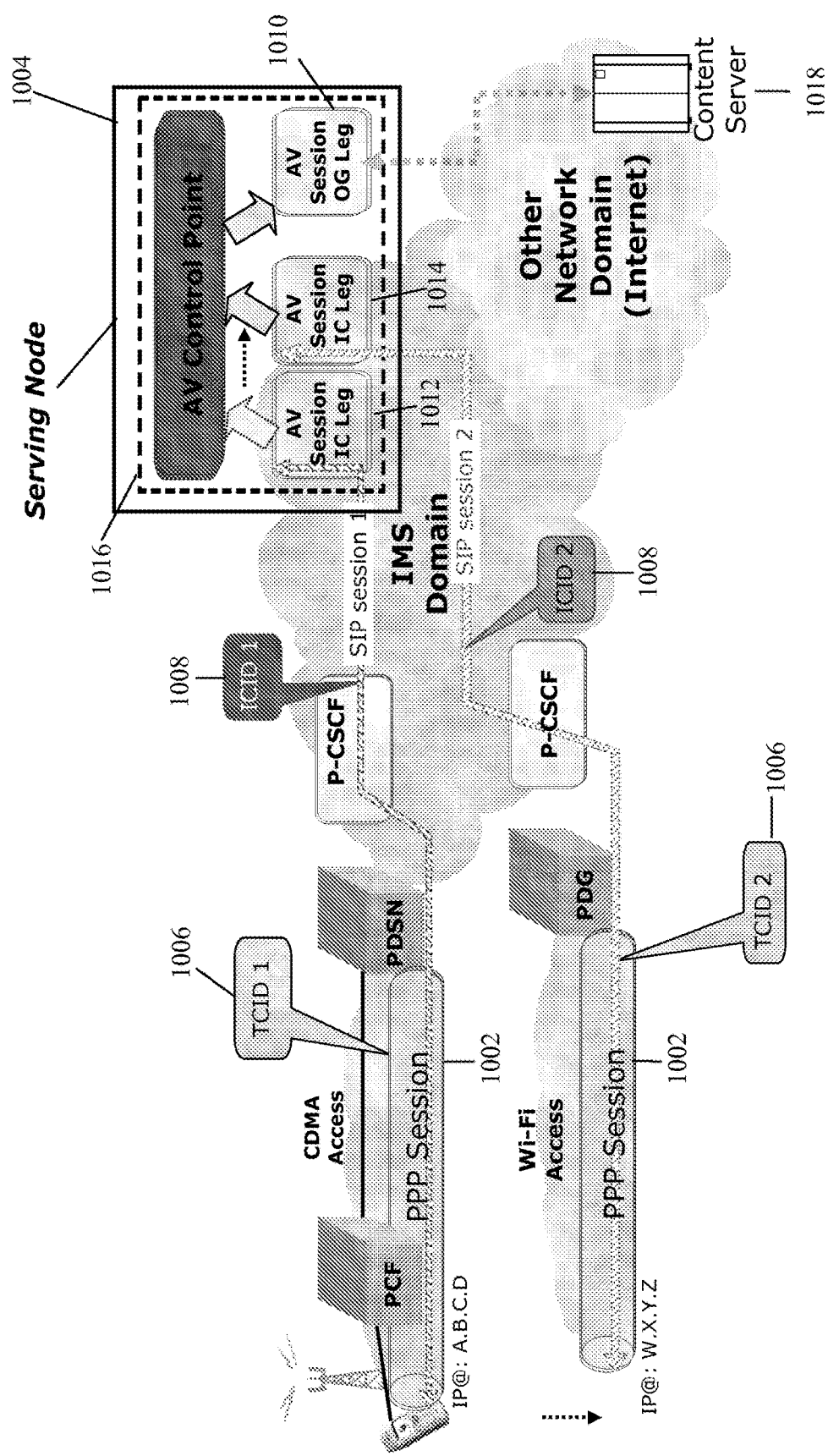
FIG. 10 depicts utilization of multiple access networks in a session having an AVS structure.

As shown in FIG. 10, PPP (Point to Point Protocol) session 1002 has its own unique identifier called the Transport Charging ID (TCID) 1006 assigned by the device (Packet data Gateway or Packet Control Function in the BSC) from which the PPP session emanates. TCID 1006 and ICID 1008 together uniquely identify the multimedia session in which the SIP/IMS signaling is embedded within the IP/PPP connection.

The ME function 412 creates or modifies a computational entity called an AVS (Audio Video Session) 1004 to model and control (in part) the actual access network connections for a given user. The call model 602a, discussed previously, is constructed first, based on the resources and policies. The AVS, on the other hand, represents what is actually going on, or intended to take place, or actually takes place (i.e., dynamically modifying to context). That is, the AVS represents the actual connections registered or to be registered in response to a given service request. If each access network connection is considered to be a "session", then the AVS is a form of meta-session, or a super-session incorporating the access network sessions. Each AVS is uniquely identified by a AVID (Audio Video session ID) that is a function of the underlying TCID and the ICID.

An AVS is a representation of every access network that the UE encounters while roaming. For each new access network this representation creates a new "leg" (called Incoming Call Leg—ICL 1012, 1014). Each ICL has associated with it a TCID and an ICID (generated by other network elements) that together uniquely identify the session corresponding to that access network. Since the AVS 1004 has access to registration information of the UE, it knows that various ICLs (and hence various TCID+ICID combinations) really belong to the same UE, and hence, for each UE, the AVS representation captures all the access networks that the handset encounters. And since some access networks may support circuit-switched (CS) transport mode whereas others may support packet-switched (PS) transport modes, ICLs may be CS or PS supporting ICLs.

Network policies (see FIG. 9) will generally govern the co-existence of ICLs within a single AVS. For example, current telecomm networks do not support the idea of a UE being associated with more than one circuit switched network. This translates into an AVS constraint; "only one ICL may exist for CS sessions." Another example of a constraint is provided by current so-called Class B handsets in which both a CS and PS protocol stack are available but only one such stack can execute at any time. Yet another example is provided by Class B+Wi-Fi handsets in which a CS session and a Wi-Fi session, or a Wi-Fi and a PS session can coexist. In a Class A handset that supports CS, PS and Wi-Fi contemporaneously, all three sessions can be active together. Such constraints, emanating from the network or the handset, translate into constraints on the type and number of ICLs can be supported by an AVS. The policies can be contained in the policy database, and as with the construction of call models, the policies may be accessed when modifying AVSs.

In one example, a class B UE is engaged in a PS session watching Mobile TV. The UE roams into a Wi-Fi zone and a handoff happens, after which the MobileTV feed uses the Wi-Fi network. The previous PS session is idle and could be cleared. However, keeping it around serves a useful purpose. For example, suppose a voice call arrives for this UE. Since the CS stack is not executing in the UE, the call will normally be routed to voice mail without the user being informed of the call. But suppose a serving node 408 is informed of the arrival of this call (as explained below), and then uses the PS session to present a dialog box giving the user a choice to take the voice call. This example shows the usefulness of having more than one session (more than one ICL) active. Policies governing a given service will dictate whether or not to keep a leg active. Moreover, sometimes a leg may be unavoidably dropped, for example via lack of sufficient use, or because of signal issues.

As stated above, the serving node 408 includes one AVS per user. As shown in FIG. 10, an AVS 1004 can include multiple ICLs 1012, 1014 and an OCL or OGL 1010 (outgoing call leg). The AVS also includes a control point 1016. As explained below, the control point (CP) may be used to provide mediation between some form of service or server and the UE. Not shown in FIG. 10 is that each leg may have effectuation routines to perform or effectuate routine functions on a given access network, such as responding to "are you alive" messages. When the serving node 408 (e.g., via the ME logic) manipulates the AVS it corresponds to actions in the "real world." For example, adding an ICL means getting registered on that access network.

Figure 11:
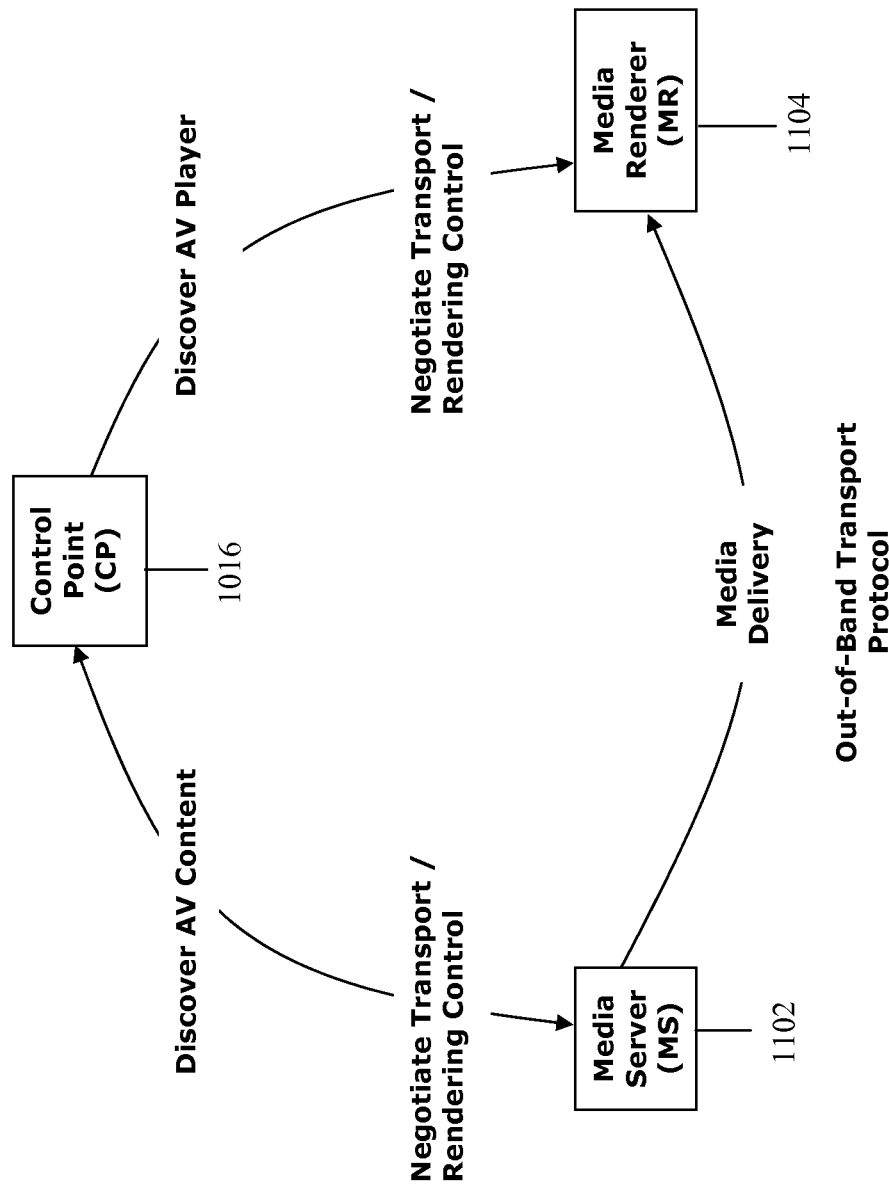
FIG. 11 depicts out-of-band mediation by a control point to use a potentially non-IMS service in an IMS context.

FIG. 11 illustrates how certain components, particularly the CP 1016 interact with other entities. It also shows how to incorporate non-IMS (legacy) services into a network, or to "marry" multiple networks. As explained below, the CP 1016 within AVS 1004, can perform out of band mediation so that a media server (MS) 1104 somewhere in the network can deliver content to a media renderer (MR) program 1106 on the UE, which receives and presents such content.

CP 1016 is connected to the MS 1102, which in turn establishes a connection to the serving node 408 (using network server specific protocols). The connection between the CP and the MS is internal to the ME 412. The connection between the MS and the serving node 408 is an Outgoing Leg 1010 of the AVS. That is, AVS 1004 models this connection as outgoing leg component 1010. CP 1016 is also connected to MR 1104, which preferable may reside in the UE. The connection between the CP and the MR is an Incoming Leg, e.g., 1012. That is, AVS 1004 models this connection as incoming leg component 1012 or 1014. Thus, in a session having multiple MRs there are multiple incoming Legs for a single AVS, as shown in FIG. 10.

Continuing with the example above, the CP negotiates multimedia content delivery with the MS and instructs the MS to deliver content to an address corresponding to the MR on the UE. The instructions provided during such mediation will conform to the environment, context, and capabilities of the UE. CP 1016 also negotiates media rendering with the MR itself in each Incoming Leg of the AVS. That is, the CP effectively instructs the MR to start expecting content from the MS, and to present such. Again, the instructions provided during such mediation will conform to the environment, context, and capabilities of the UE.

When an access network connection is discovered by the UE sensing logic and communicated to ME server 412, and if the policy database 902 (FIG. 9) permits its use, the newly discovered access network connection is modeled and included into the current AVS as an Incoming Leg. Each access network available to a UE corresponds to an Incoming Leg of an AVS and the connection between the CP and MS corresponds to the Outgoing Leg of the AVS.

Thus, if the UE has sensed three different access networks and policy allows all three, then there are three distinct access network connections between the UE and the S-CSCF. In such a situation, there are signaling and bearer channels in each access network that can be utilized. It is a matter of policy that decides which signaling channel within an access network is to be used and which channels within an access network is to be used for bearer traffic. In the case when coverage of an access network is lost (for example, due to roaming of the UE), the corresponding access network connection and the associated AVS Incoming Leg is "cleared" under S-CSCF serving logic control by the P-CSCF.

As mentioned above, many new kinds of access networks, such as Wi-Fi and WiMax, are being deployed. The proposed IMS specifications allow the UE to connect to an access network. Preferred embodiments of the present invention allow the UE to remain in simultaneous connection (or potential use) with multiple access networks and the choice of which access network to deliver a particular service to the UE is to be made by policies resident in the ME function in the serving node of the network. That is, the AVS facilitates control of multiple access networks (both signaling and bearer) and allows choices to be made (by the system and perhaps the user) as to which network to use in a given context and time.

In conjunction with deployments of various kinds of access networks, handset manufacturers are also producing handsets that support multiple radio access technologies. Examples of such handsets today are those that support Wi-Fi and GSM/CDMA cellular networks. In such handsets, known as Class A handsets, both the circuit switched session of the GSM/CDMA network and the packet switched session of Wi-Fi can co-exist and be active simultaneously. Moreover, there are numerous proposals for voice call handoffs between cellular (GSM/CDMA) and Wi-Fi networks.

Using the described embodiments, a Class A handset can have multiple packet sessions and a circuit switched session simultaneously active in the handset. In the terminology explained above, the corresponding AVS may have multiple Incoming Legs corresponding to one circuit switched and multiple packet switched sessions. Another type of handset, called a Class B, handset only supports either a circuit switched session or a packet session at any given time. If the handset roams into a Wi-Fi area from a cellular area, the circuit switched session is replaced by a new packet switched session supported by the new Wi-Fi network in a Class B handset; in a Class A handset the circuit switched session can be allowed to persist. This corresponds to removing one Incoming Leg of the AVS (representing the circuit switched cellular connection) and adding another Incoming Leg (representing the Wi-Fi connection) to the underlying AVS for Class B handsets. In the case of Class A handsets in which the circuit switched session is not cleared, the situation corresponds to simply adding another Incoming Leg to the AVS session.

The following scenarios for Class A and B handsets are possible:

1. Two subscribers A and B are in a voice call. The AVS corresponding to this call for A's UE may have an Incoming Leg (circuit switched) for A. The AVS for B's UE has an incoming leg ("packet switched") for B. Thus, A is engaged in a circuit switched call and 'B' is engaged in a packet switched call; the two parties in the call are using different access technologies. This example extends to multiparty calls.
2. Two subscribers A and B are in a voice call. Both users are assumed to be using packet switched sessions (i.e., packet-switched [PS] modulation over the cellular spectrum). Under roaming conditions, at some point in this call, assume that both roam into new access networks that offer the resources (e.g., bandwidth) to support a video telephony sessions between A and B. These new access networks will correspond to new Incoming Legs added to the AVSs, along with new media renderers, and the policy in ME will dictate the use of the new access networks to support the video call. The new media renderers for the video telephony will be OCLs for each of the AVSs—i.e., AVS for A and an AVS for B.
3. Two subscribers A and B are in a voice call. Assume that A is in a circuit switched session and that B is in a packet switched session. Now assume that A roams into a new access network such as Wi-Fi that supports video telephony. This new access network corresponds to a new Incoming Leg of the underlying AVS for A. The AVS under policy control may now be, as in use case number 2 above, converted into a video telephony session. An OCL may be added to correspond to a new OCL for the MR for the delivery of video telephony.
4. Two subscribers A and B are in a circuit switched voice call. A now wishes to send a multimedia message including images to 'B.' Assume that both A and B had previously roamed into new access networks that correspond to packet switched sessions (Incoming Legs) in the underlying AVS for each. These packet switched sessions can be used to deliver the multimedia object from A to B.

Scenarios 1-4 show that by having access to multiple access networks under mobility situations, the described embodiments allow services that use a combination of packet and circuit switched access network technologies.

As explained above, mechanisms to utilize non-IMS, legacy services within an IMS context are provided. To do this, the system logically separates the control and bearer parts of the legacy service. The control component of the service is handled by IMS, and the bearer component may remain independent of IMS. The control point (CP) 1016, referred to earlier, is the mechanism used to allow "out of band" media transport under control of IMS. Under preferred embodiments every AVS 1004 has an associated CP 1016, for example, logically within the AVS. More specifically, each AVS is designated to have an "Outgoing Leg" (OCL) 1010 that contains a CP. The CP has capability to transact with an Application Server (AS) using a standard protocol, such as RTSP, and it has the capability to transact with programs in the UE called Media Renders (MRs), again using standard protocols such as SIP, or SOAP/HTTP. The CP itself may be considered an Application Server (AS) by the S-CSCF (i.e., interacted with as if it were an AS).

Now consider a UE requesting Mobile TV service. This request emanates from the UE (on an ICL) and is forwarded by the S-CSCF to the CP 1016 acting as an AS (in standard IMS fashion). Since the CP acting as an AS has access to IMS charging and authentication mechanisms, the first objective of re-using IMS infrastructure for legacy services is fulfilled. Once the charging and various other bookkeeping functions have been finished, the CP contacts the MobileTV server (e.g., illustrated as Content Server 1018 in FIG. 10) using RTSP protocol. Alternatively, the CP could pass control to another Application Server that now contacts the MobileTV server using RTSP", i.e., there is a chain of Application Servers as in standard IMS. (Chaining of application servers is a known technique). The CP instructs the MobileTV server to initiate sending media to the UE (at a designed IP address) and instructs the MR in the UE to render the incoming media. (See FIG. 11.) This media transfer from the MS to the MR may use an out-of-band (non IMS) transport such as RTP/UDP/IP. In some situations, other approaches to deliver media will be needed. For example, the MobileTV server may not support the capability of receiving a service request from client A and initiating service to a client at a different address. In this case the MobileTV server will be asked to send the media to the CP's address and it will be forwarded to the UE by the CP, a process called re-NATting).

The communication between the CP and the UE for setting up media rendering and for other functions uses valuable spectrum. In order to reduce such spectrum-consuming communications, the relationship between an MR and a media server can be fixed a priori and pre-provisioned. Thus the CP always picks a pre-designated MR for a particular media server.

Figure 12:
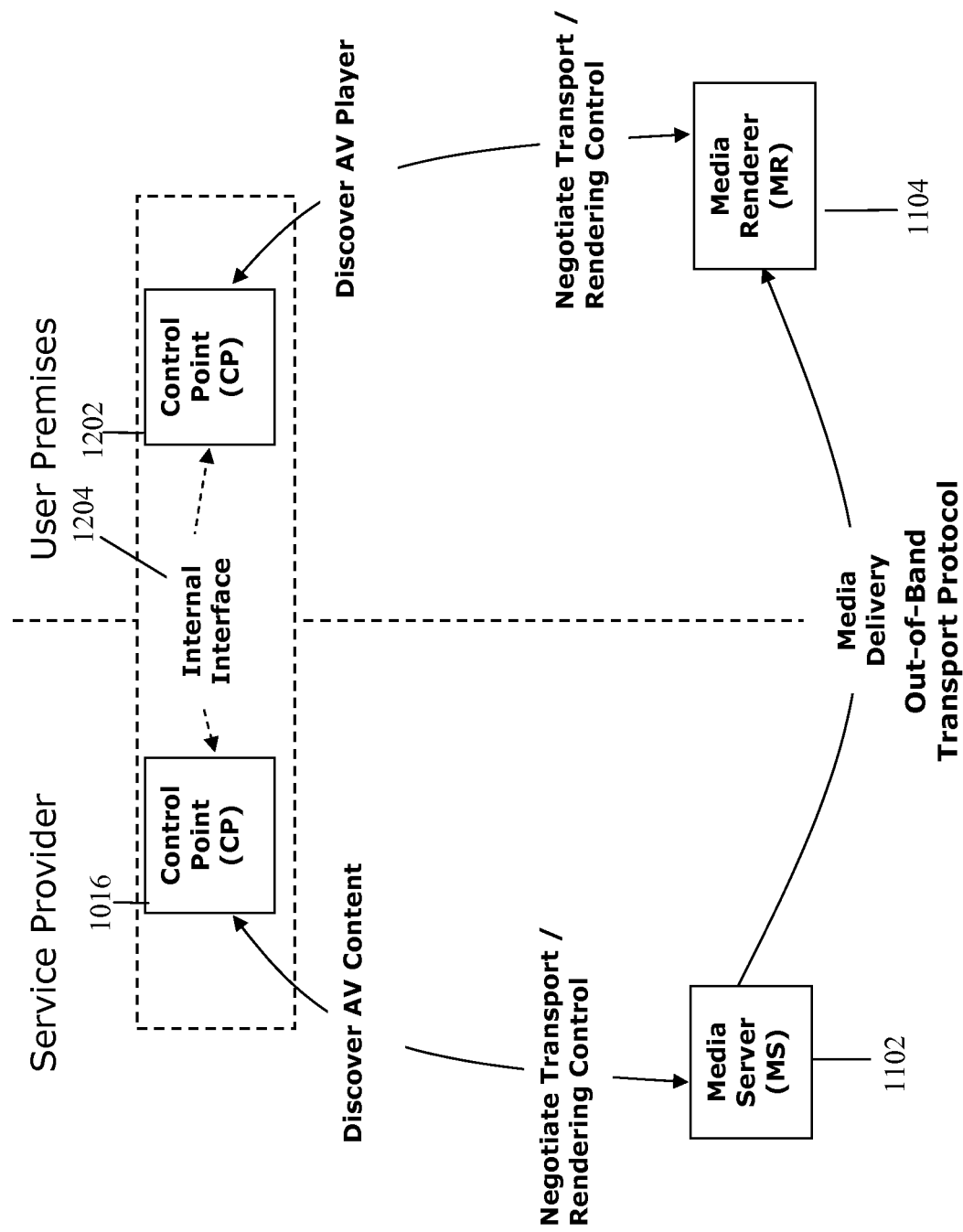
FIG. 12 depicts out-of-band mediation by a control point and a control point proxy to use a potentially non-IMS service in an IMS context.

In a preferred embodiment, wireless spectrum-consuming communications between the CP, media servers and media renderers are reduced by introducing a CP Proxy (CPP) that resides in the UE. This architecture is illustrated in FIG. 12.

As indicated above, UPnP architecture includes three functional entities: control point (CP), media server (MS), and media renderer (MR). These may be implemented in different physical devices. In a digital home environment, for example, the MS and MR typically reside in a TV set and the CP in a remote control unit.

It is assumed that the MS and MR entities represent abstractions that capture the essence of media servers and media renderers. The abstractions allow programmers to write general-purpose software that deals with the properties of these entities without having to deal with their inner workings. The handling of these inner workings is left to the implementation of the media server and the media renderer themselves. Thus, by way of example, if a program desires to issue a "suspend" command to a MS, it may use the MS's defined interface to issue that command, it is left to the MS to implement the "suspend" command.

Communications between the CP and an MS and MR use the SOAP/HTTP protocols. Direct communication between a MS and a MR is referred to as "out of band," since is up to the MS and MR to select the protocol. One such protocol is RTSP/RTP.

In one example, the MS implements a video player, the MR implements an LCD display, and the CP implements a remote control unit. The CP queries the MS for a contents directory and presents that on the display unit, allowing content to be selected for rendering. The commands between the CP and MS, and between the CP and MR use SOAP/HTTP. The communication between MS and MR could use RTSP/RTP.

In a wireless network in which the CP implements a handset, and the MS and MR implement a non-mobile media server and media renderer, the wireless network could be used to carry a control protocol between the these three entities, akin to SOAP/HTTP (but perhaps a more secure version). However, this approach suffers from the disadvantage that the control messages between the CP and the MS, and the CP and the MR use the limited capacity of the wireless network.

In certain embodiments, the UPnP architecture is extended into a wide area network environment. One approach, illustrated in FIG. 12, reduces control message traffic over the wireless network by moving CP 1016 into a network element and running one or more CPPs 1202 in one or more handset(s). This architecture has two advantages. First, the communication between CP 1016 and MS 1102 need no longer use the wireless network. Second, when CPP 1202 is in close proximity to MR 1104, the handset (CPP) can use an available Personal Area Network (PAN), such as Wi-Fi, to communicate with the MR. Since the wide area wireless network uses expensive spectrum, these advantages can afford considerable cost savings.

In this architecture, the CP and the CPPs need a synchronization protocol. Communication between the CP and the CPP could be optimized by using off-peak times to communicate and by making the CPP as independent of the CP as possible.

Moving the control point into the wide area network enables a user to connect to services provided by MSs that are not located in the home, such as foreign television stations. In addition, MSs, whether in the home or not, can now be rendered on MRs outside the home, such as on the handset itself, or on a MR that is in proximity to the handset running the CPP when the handset is outside the home, as described above.

CP 1016 running in the SN can support multiple CPPs. For example, there can be a CPP implemented in a handset, and also in a remote control unit. When the user is inside the home, he may prefer to use the remote control unit as the CPP since it may have a better form factor for VCR-type controls. On the other hand, when the user is outside the home, he invokes the CPP on the handset in order to maintain connection and control with the home network.

The above techniques are illustrated by the following communication sequence. A subscriber requests a media service to be rendered on a home Wi-Fi-enabled display device. CPP 1202 communicates with CP 1016 via internal interface 1204 using the wide area wireless network. Subsequent communication between CP 1016 and MS 1102, or between CPP 1202 and MR 1104 need not use the wireless network. Upon receiving confirmation from CP 1016, CPP 1202 instructs MR 1104 to negotiate an out-of-band service request with MS 1102.

In the case where the UE is in the proximity of both the desired MS and the desired MR and can communicate with them via a PAN, such as Wi-Fi, the CPP in the UE negotiates the association between the MS and MR. In this case there is no need to involve the CP in the SN, since this would involve unnecessary use of wireless bandwidth. Conversely, when the UE is not in the proximity of either the desired MS or the desired MR, the CP handles the negotiation and association of both the MR and MS, using fixed communication links instead of wireless links.

Thus, in a wide area networking extension of UPnP, moving the CP into a network element, such as the serving node of an IMS session, and placing the CPP into the handset optimizes usage of the wireless spectrum usage.

This architecture also allows normal telephony to be integrated with UPnP-based media services. As used herein, normal telephony includes supplementary features such as call diversion, three-way calling, and voicemail.

In an alternative architecture, the CP does not migrate to the core network, but continues to reside in the handset. In this peer-to-peer style architecture, there is no core network element, but the peer-to-peer signaling uses the valuable and limited resources of the wireless spectrum. The network-based architecture, as indicated above, consumes less wireless spectrum.

CPP 1202 has local service logic that decides what MR to pick for a particular media server. In other words, the CP-MR negotiation is transformed into CPP-MR negotiation (which is local to a UE and hence does not use spectrum). Moreover, the CPP policies and logic can be updated periodically from the network-resident CP at opportune times.

In yet another embodiment, the concept of MVNO-customized logic may be applied to so-called hybrid networks. In general a hybrid network is a combination of two or more individual networks. Examples of digital broadcast networks for joint use are DVB-H (Digital Video Broadcast—Handheld), and Media FLO (Forward Link Only). In a hybrid network, the broadcast network provides a high capacity but one-way transport for multimedia (video) traffic, while the UMTS (Universal Mobile Telecommunications System) network (or other network) may provide lower capacity two-way transport for interactive services. In such hybrid networks, the UMTS network is used for control and signaling purposes for the services offered by the broadcast component network. In this fashion, the UMTS network supplements the digital broadcast network by providing a control network or a network for user interactivity functions. Conversely, the broadcast network may supplement a UMTS (or other) network by providing certain broadcast functionality.

Since the PA runs in mobile handset environment, the handset has a direct logical service interface to the Internet Wide Area Network (WAN) via the 2G/3G wireless network. From the UPnP device architecture perspective, the PA serves as an Internet Gateway Device (IGD). An IGD is an "edge" interconnect device between a residential Local Area Network (LAN) and the Wide Area Network (WAN), providing connectivity to the Internet. The IGD typically runs in the local network environment, e.g., on a PC in the WLAN environment.

In the search process described below, the discovery, registration, and use of an associated device corresponds to the setting up of a new incoming leg of the AVS session. The ME server then determines whether there is an advantage to be gained from switching the media rendering from the renderer in the handset to a renderer in a discovered device. The CPP can then offer a choice to the user as to whether to switch to the new renderer, or the switch can be performed automatically.

Figure 13:
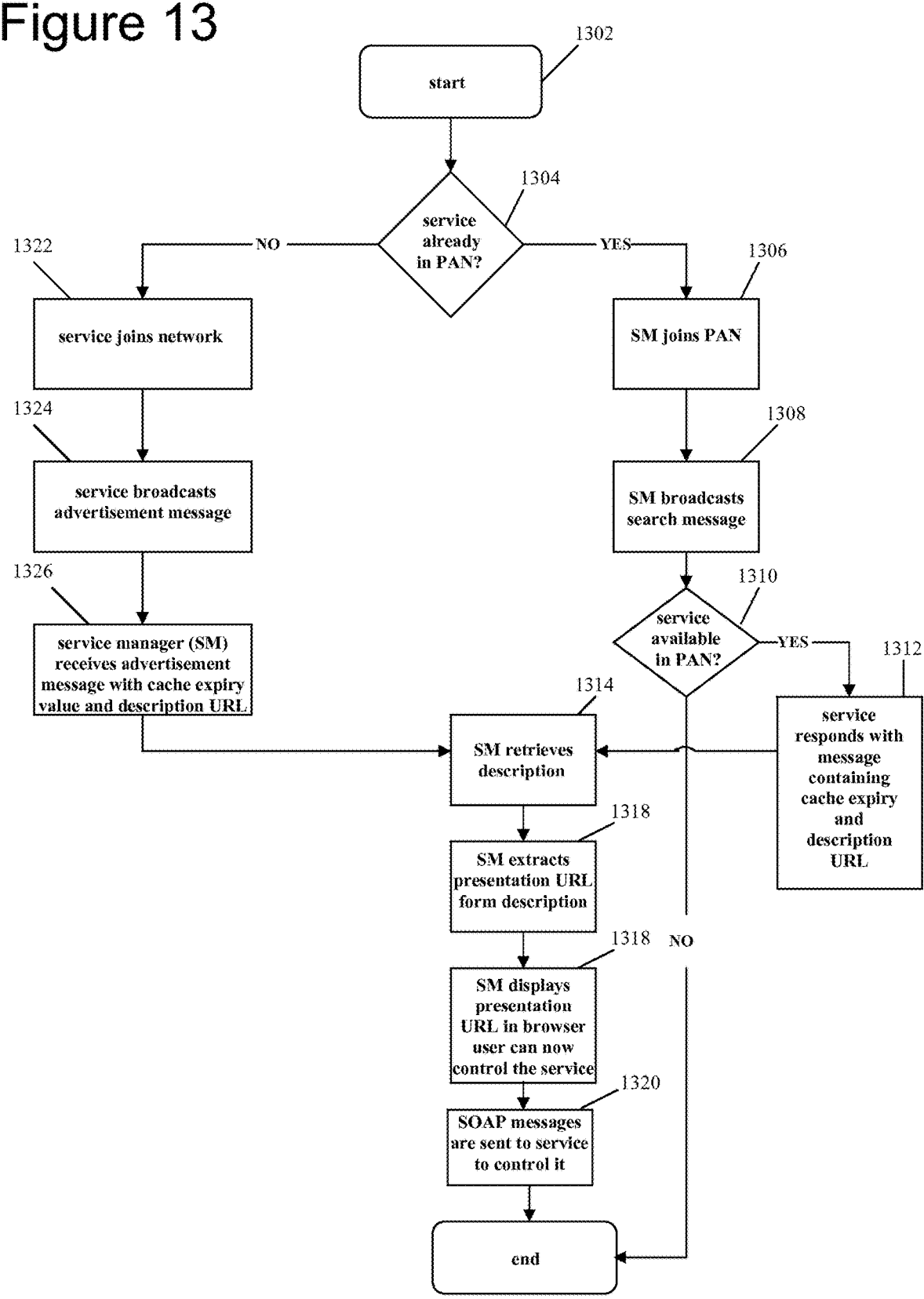
FIG. 13 is a flowchart illustrating how devices and services are discovered and associated by the UE.

A UPnP service manager (SM) is provided in the PA to organize the services discovered, as shown in FIG. 13. The UPnP service manager performs device/service search and also listens to advertisements being sent out by new devices. FIG. 13 illustrates exemplary logic for the service manager. The service manager logic starts (1302) when the PA detects the presence of a PAN. The service manager consults a directory of services that are potentially available on the PAN (1304). If the UE is seeking to use a service, and it finds the service present in the directory, the service manager joins the PAN (1306) and broadcasts a search message (1308). When the PA receives responses from the services on the PAN, it determines whether the user is authorized to use the desired service, and whether the service is still available (1310). If the answer is yes, the process for associating the PA with the new service takes place (1312, 1314, 1316, 1318, and 1320). If the UE is seeking to provide a service in the PAN, and the service is not already present in the PAN (1304), the service manager joins the network (1322) and broadcasts an advertising message (1324). In response, it may receive messages from the devices on the PAN (1326), and then proceed to associate itself with PAN (1314, 1316, 1318, and 1320).

Two functions enable the discovery process: search module 426 (see FIG. 4) running in PA logic 424, and the advertisement module, running in a device to be added to the network.

Search Module

Search module 426 is a UDP-based function in the PA that broadcasts search messages whenever the user wants to search for new devices. It communicates with the user interface of the service manager and updates a list (in the PA logic 424) of discovered devices on the service manager when it finds a new device. It determines whether or not the device is new by matching its Universally Unique Identifier (UUID) against those of the devices already discovered. Each device has a unique UUID.

Search Module 426 consists of the following procedures:
Discovery:
The discovery protocol allows control point proxies, such as the PA, to search for devices of interest in the network. A search is carried out by multicasting a search message with a pattern equal to a type or identifier for a device or service. Responses from service providers/devices contain discovery messages that are essentially identical to those advertised by newly connected devices. In other words, the responses to the outgoing discovery messages from the PA are similar to the messages the service providers/devices are themselves unicasting as their own advertising messages, as described below. The former are unicast while the latter are multicast. Below is a format of a Search message:
M-SEARCH*HTTP/1.1
HOST: 239.255.255.250:1900
MAN: ssdp: discover
MX: seconds to delay response
ST: search target
Response:
In a response, the discovered device sends a message to the M-SEARCH source IP address and port that sent the discovery request to the multicast channel. This response follows the same pattern as listed for NOTIFY with "ssdp: alive" (see below in the description of the advertising module) except that a search target (ST) header is used instead of the new target (NT) header. The format is as follows:
HTTP/1.1 200 OK.
CACHE-CONTROL: max-age=seconds until advertisement expires
DATE: when response was generated
EXT:
LOCATION: URL for UPnP description for root device
SERVER: OS/version, UPnP/1.0, product/version
ST: search target
USN: advertisement UUI
Description:
After the PA has discovered a device, the PA still knows very little about the device. In order to learn more about the device and its capabilities, or to interact with the device, the PA retrieves the device's description from the URL provided by the device in the discovery message. The PA sends the following request header to the discovered device:
GET path to description HTTP/1.1
HOST: host for description: port for description
ACCEPT-LANGUAGE: language preferred by control point.

By default the 'Host' and 'Accept' header fields in the request headers are sent, following normal conventions, such as from HTML. Once the socket is created, where the HostName and RemotePort properties are set to the values specified in the URL, the request header block is then sent to the discovered device, which consists of the command (GET) and the other header fields defined above. A sample of a device description in the XML format is shown:

```
<serviceList>
<service>
<serviceType>Telephony</serviceType>
<SCPDURL>URL to service description</SCPDURL>
<controlURL>URL for control</controlURL>
<eventSubURL>URL for eventing</eventSubURL>
</service>
</serviceList>
```

Advertisement Module

When a device is added to the network, it advertises its services to control points by multicasting discovery messages to a standard address and port at regular time intervals. Serving as an UPnP control point, the PA listens to this port to detect when new capabilities are available on the network. Each advertisement message contains information specific to the embedded device or service as well as information about its enclosing device. Messages should include the duration until the advertisements expire. If the device becomes unavailable, the device will either explicitly cancel its advertisements, or wait for the advertisements to expire on their own.

The advertisement module in the PA listens for advertisement messages. It is also a UDP-based application that listens on port 1900 (as given in the UPnP specifications). It communicates with the user interface of the service manager and updates the list of discovered devices on the service manager when it finds a new device. It determines whether or not the device is new by matching its UUID against those of the devices already discovered.

The service manager is needed because more than one service may be present in the Personal Area Network (PAN) and the manager provides an easy and intuitive way for the user to manage all the discovered services/devices. In addition, the service manager is responsible for communicating the updated PAN neighborhood configuration (i.e., context) of the mobile handset to serving node 408. The discovered device and service will be reported to the serving node 408 in a SIP message which includes an SDP extension header. The service manager enables the mobile handset user to accomplish this.

When a new device is added to the list in the service manager a timer is started whose value depends on the cache-expiry value sent by the device. Once this timer expires, the device/service is removed from the list. However, if an advertisement message is received from that device the timer is restarted.

The format of the multicast message is as follows: values in italics are placeholders for actual values.

NOTIFY*HTTP/1.1
HOST: 239.255.255.250:1900
CACHE-CONTROL: max-age=seconds until advertisement expires
LOCATION: URL for UPnP description for root device
NT: search target
NTS: ssdp: alive
SERVER: OS/version, UPnP/1.0, product/version
USN: advertisement UUID UPnP Device Discovery The following case illustrates by way of example a session that involves the PA client discovering an associated device via UPnP Discovery mechanisms. In this example, the new device to be associated with the PA client is powered on and starts advertising its service and device descriptions. For example, the new device might be a PC with IGD software, whose display will be used as a media renderer.

Figure 14:
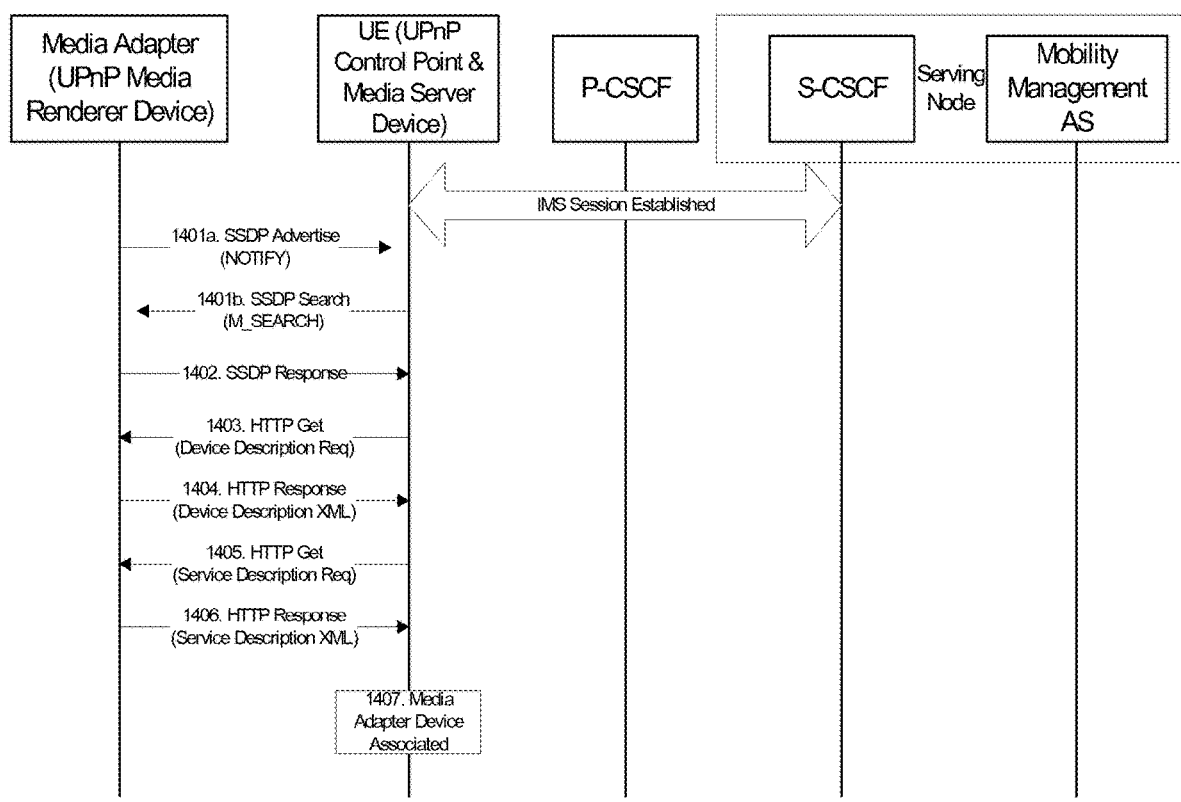
FIG. 14 is call flow diagram depicting the discovery of a device by a UE.

As depicted by 1401a, 1401b, and 1402 in FIG. 14, when a device is added to the network, the device is allowed to advertise its presence on the network using Simple Service Discovery Protocol (SSDP). The UPnP discovery procedure operates transparently on top of various wireless or wired PANs or Home Area Networks (HANs), such as Bluetooth, Wi-Fi, USB, etc. When a control point such as the PA IMS/SIP mobile client is added, the control point is similarly allowed to generate a multicast search for devices. In either case, the message exchange consists of a brief description of the device that includes the UPnP device type, the device ID, and a URL to the full device description. The message formats are as described above.

Next, as depicted by steps 1403-1406 in FIG. 14, the UE obtains more information about a specific device by retrieving the full description from the URL with HTTP GET. The full description is composed of a device description and a service description. The device and service descriptions are XML documents and are constructed by the device vendor with the aid of the device and service template schemas. The service description contains details of the hosted API commands, which are called actions, along with parameters, which are called arguments.

As shown by 1407 in FIG. 14, once the device and service descriptions of a particular media device in the PAN/AN have been retrieved, the PA IMS/SIP mobile client has established an association with that device, completing the UPnP device discovery process.

Associated Device Discovery and Handoff Session Via UPnP

The following case illustrates a session that involves the PA client discovering an associated device via UPnP Discovery mechanisms, and the serving node triggering a handoff procedure from the PA client to the associated device to initiate a real time streaming protocol (RTSP) streaming session. In this example, an IMS/SIP session has been established between the PA and the Media Server Control AS in the serving node.

Figure 15:
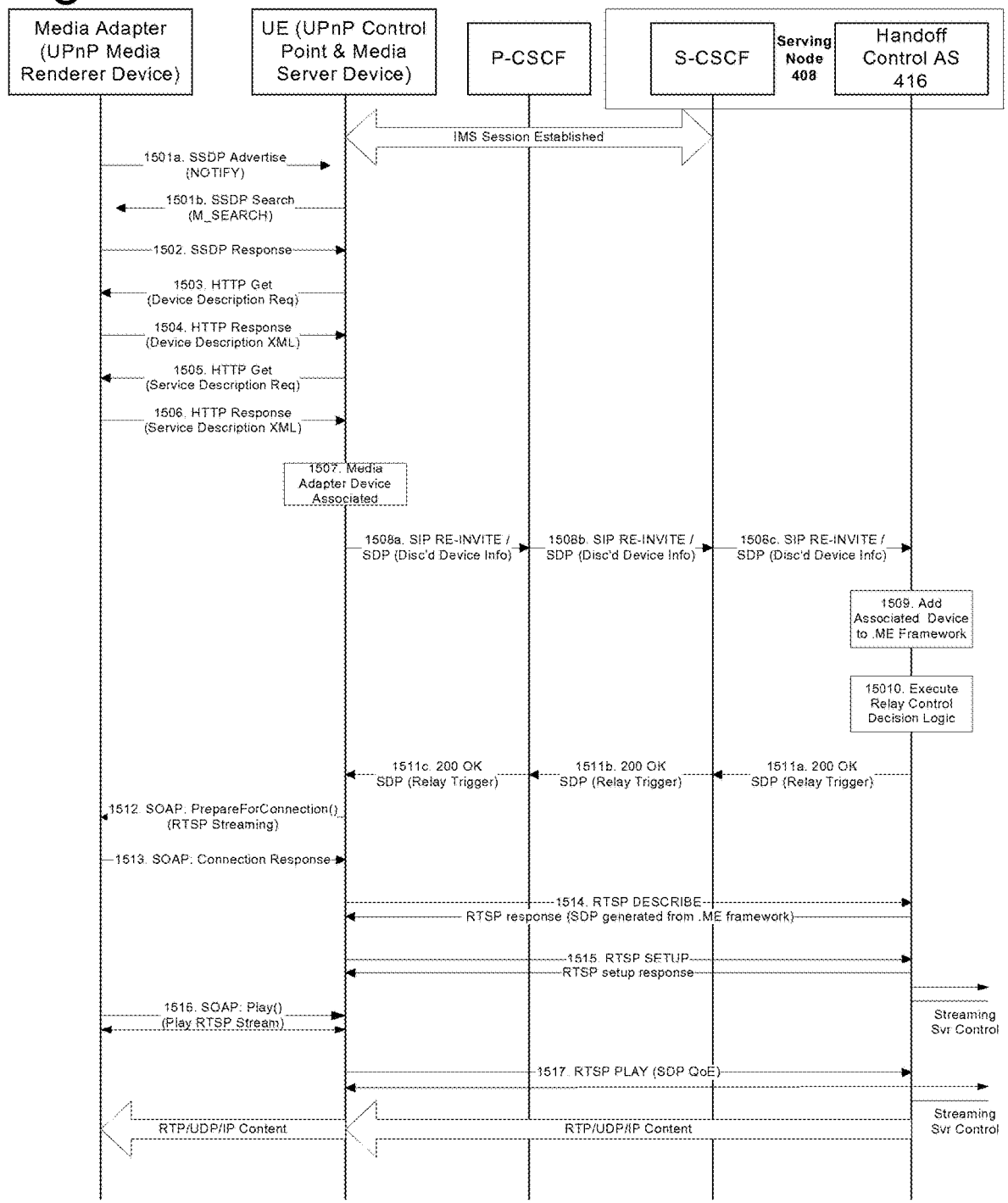
FIG. 15 is a call flow diagram depicting the discovery of a device by a UE and subsequent handoff to the device.

As depicted by 1501-1507 in FIG. 15, the discovery and association of the new device proceeds as described above. Next, as shown by 1508a, 1508b, and 1508c, the PA IMS/SIP mobile client, located in the user's home network, includes the newly associated device information in the SIP RE-INVITE message it sends to Handoff Control Application Server (AS) module 614 (within serving node 408). In this message, the mobile station (MS) or UE includes its original SIP user identifier into the from-field of the SIP header. It also includes its new IP address into both the Contact field of the SIP header, in order to inform the corresponding host where it wants to receive future SIP messages, and also into the c (Connection) field of the SDP header that contains a description of the session, in order to redirect the data traffic flow towards its new location.

As depicted by 1509 in FIG. 15, the information about the newly discovered device is added to the ME framework database entry associated with the mobile device. In addition, as depicted by 10 in FIG. 15, the new device discovery/association event may trigger a handoff control decision to be executed in the Handoff Control Application Server module 614. This decision is driven by policy logic in policy database 902 (see FIG. 9). The policy logic includes rules that depend on technical specifications of the discovered device that determine whether the discovered device, if associated with the ongoing IMS session, would add value to the user. The policy logic may also include business-based rules that reflect the relationship of the user to the owner/operator of a discovered device.

As depicted by 1511a, 1511b, and 1511c in FIG. 15, if a handoff event is triggered, the response from the serving node towards the PA mobile client includes the handoff control information.

As depicted by 1512 and 1513 in FIG. 15, the PA IMS/SIP mobile client issues a SOAP remote procedure call to the media renderer (i.e., the device that renders the media) to initiate a RTSP streaming session. Services (i.e., media renderer) keep state tables updated so that control points can obtain meaningful values. When state variables change, events are broadcast over the home IP network to all interested control points, which may include multiple handsets having PAs and CPPs in a home environment.

As depicted by 1514 and 1515 in FIG. 15, the media renderer initiates the RTSP signaling transactions to establish a streaming session with the media server. As depicted by 1516 in FIG. 15, the PA mobile client sends a SOAP remote procedure call to the media renderer to PLAY the multimedia stream.

As depicted by 1517 in FIG. 15, the media renderer sends the RTSP Play command to the streaming media server to start the media stream. This stream is out-of-band transport of the media stream from the media server to the media renderer.

As depicted by 1518a, 1158b, and 1518c in FIG. 15, the user may optionally decide to disengage the serving node from controlling the media server and allow the media control to be handled directly from the media renderer. In this case, the PA mobile client sends a SIP RE-INVITE message towards the media server control application in the serving node to disengage.

Associated Device Discovery and Relay Session Via UPnP

The following case illustrates a session that involves the PA client discovering an associated device via UPnP discovery mechanisms, and the serving node triggering a relay procedure to allow RTSP streaming content to be relayed from the PA client to the associated device. In this case, the media transport takes place over the 2G/3G network to the handset, and from the handset it is relayed to a discovered associated device using a WLAN/PAN.

In this example, the PA acts as a SIP UE and an IMS/SIP session has been established between the PA and the Media Server Control AS in the serving node.

Figure 16:
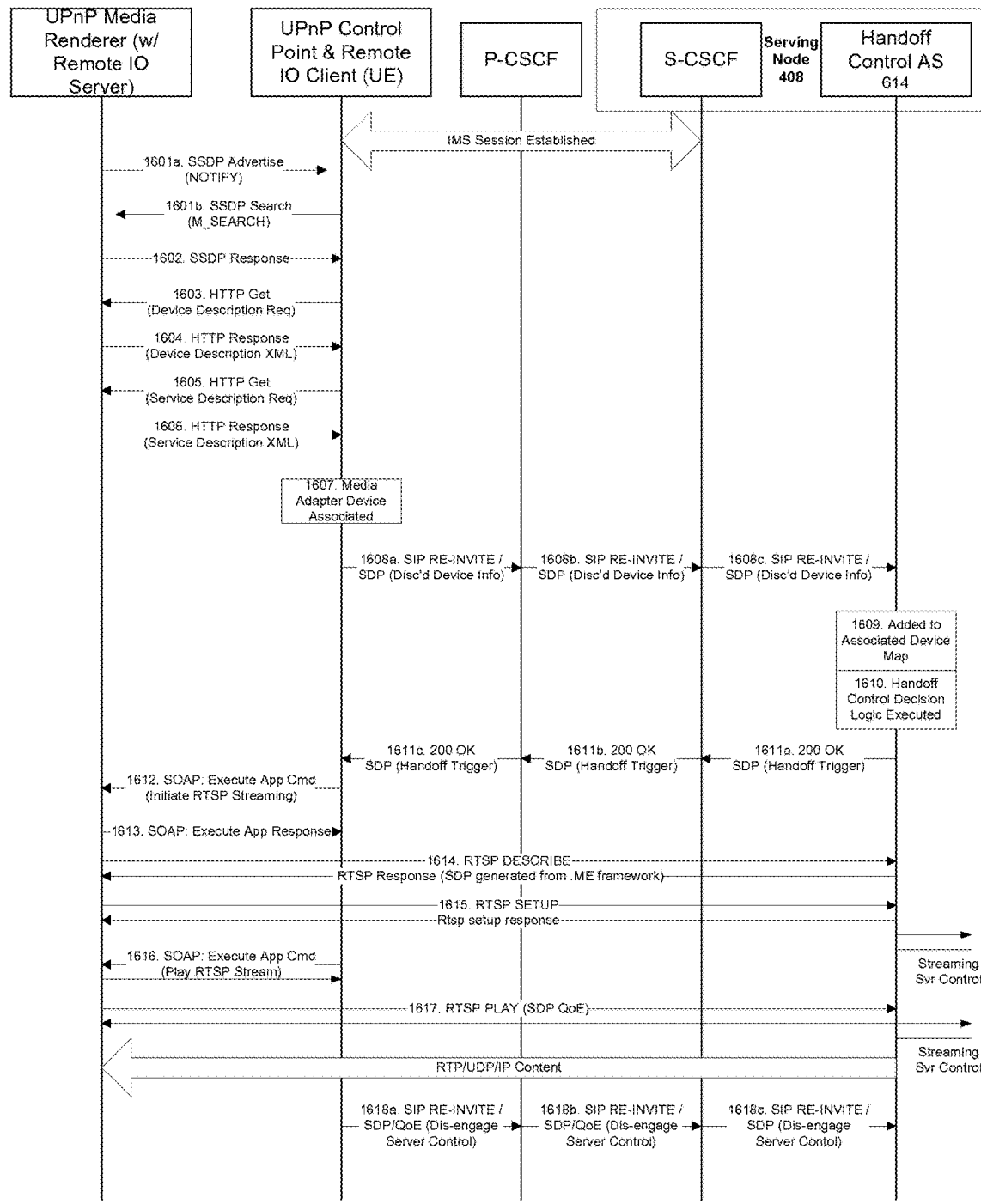
FIG. 16 is a call flow diagram depicting the discovery of a device by a UE and the establishment of a relay session to stream content to the device.

As depicted by 1601 to 1609 in FIG. 16, the steps involving discovery are as described above in connection with FIG. 15.

As depicted by 1610 in FIG. 16, the new device discovery/association event triggers an action to have the PA relay the content to the newly associated device.

As depicted by 1611a, 1611b, and 1611c in FIG. 16, the response from the serving node towards the PA client includes the relay control information.

As depicted by 1612 and 1613 in FIG. 16, the PA client issues a SOAP remote procedure call to the associated device, which, in this case, is a media renderer, to establish a UPnP LAN connection.

As depicted by 1614 and 1615 in FIG. 16, the PA client, serving as an UPnP media server device initiates the RTSP signaling transactions to establish a streaming session.

As depicted by 1616 in FIG. 16, the associated device operating as an UPnP media renderer sends a SOAP remote procedure call to the PA client to initiate the PLAY action to start the multimedia stream.

As depicted by 1617 in FIG. 16, the PA client sends the RTSP PLAY command to the multimedia server to start the media stream.

As depicted by 1618a, 1618b, and 1618c in FIG. 16, the user may optionally decide to disengage the serving node from controlling the media server and allow the media control to be handled directly from the media renderer. In this case, the PA client sends a SIP RE-INVITE message towards the media server control application in the ASN to disengage.

Dynamic Media Resource Control

This case illustrates a session that involves the PA client discovering an associated device via UPnP Discovery mechanisms, and the serving node triggering a handoff procedure to allow RTSP streaming content to be relayed from the PA client to the associated device. In addition, the serving node also determines that the content to be delivered to the newly associated device via the PA (relay) requires trans-coding and directs a Media Resource Control Function (MRCF) to establish the trans-coding session. Transcoding can involve, for example, changing the spatial or and/or color resolution of a video stream to take advantage of higher resolution viewing capability on a discovered device.

As described in detail below, in this case the MRCF responds to the INVITE request with a 200 OK message indicating the selected media in the SDP. The MRCF will also reserve the requested local resources at that time and return the appropriate resource identifiers in the 200 response.

In one embodiment, the Media Server Control AS controls a trans-coding session and is aware of MRCF capabilities. The MRCF accepts INVITE requests sent from the AS, via the S-CSCF, to dynamically set up the trans-coding configuration. The INVITE sent to the MRCF contains sufficient information to support the RTSP session that requires trans-coding. The MRCF always grants the requests from the AS, unless it has reached its resource limits.

It is assumed that the PA is acting as a SIP UE and that an IMS/SIP session has been established between the PA and the Media Server Control AS in the serving node.

Figure 17:
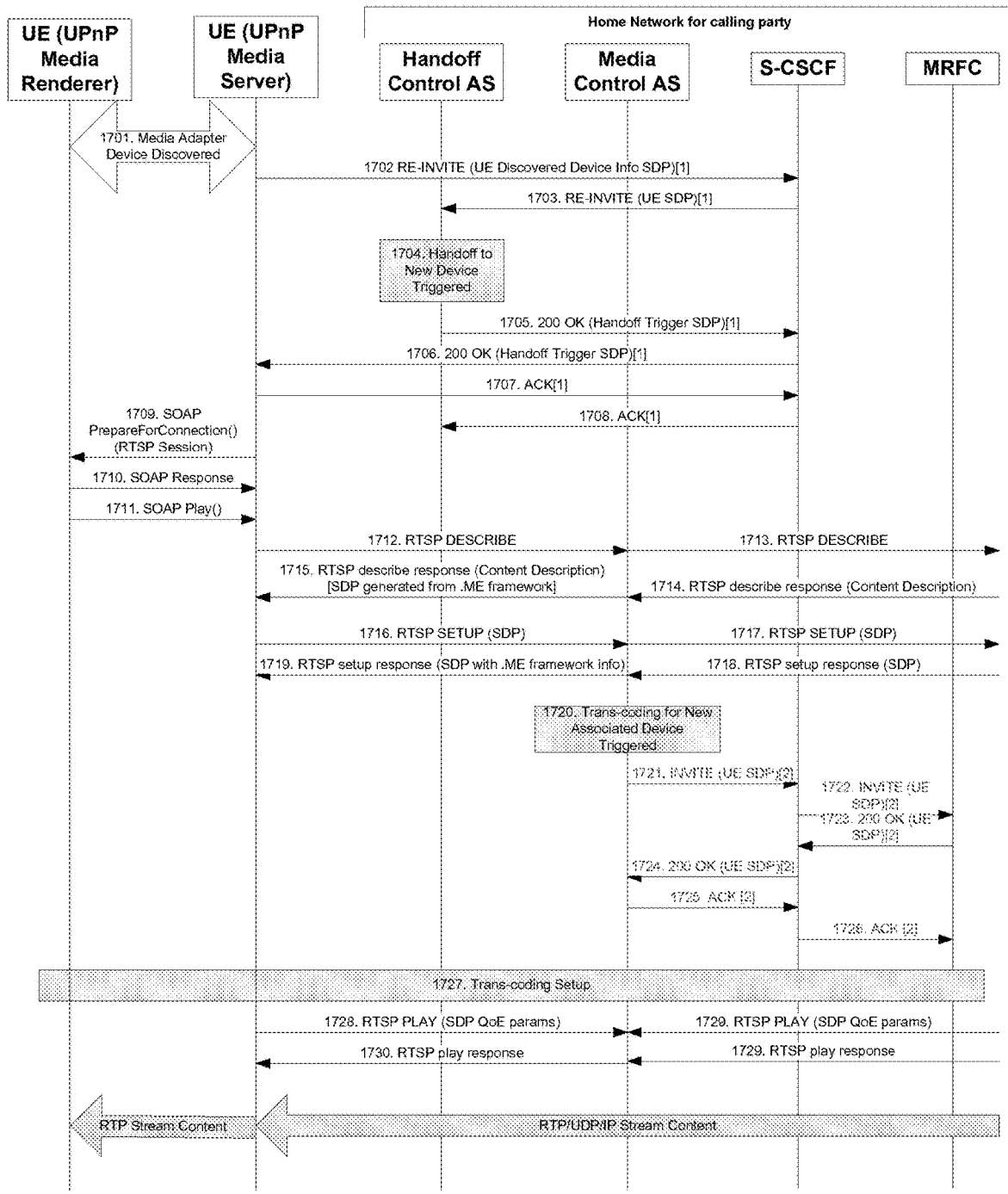
FIG. 17 is a call flow diagram depicting discovery of a device by a UE and subsequent streaming of trans-coded information to the device.

FIG. 17 illustrates the steps involved in setting up the MRCF to provide trans-coding for a mobile originated session, where the MRCF is receiving directions from the AS operating as a back-to-back user agent (B2BUA). In other words, the AS can initiate calls/sessions itself. In FIG. 17, the number enclosed within the square brackets, i.e., the "[x]" notation, is an indicator of a particular SIP dialog.

As depicted by 1701 in FIG. 17, the media renderer device is discovered by the PA, as described in detail above.

After the Handoff Control AS has triggered a PA relay action, an RTSP streaming session is initiated from the mobile handset (1702-1719). The Media Server Control AS is aware of the different codec requirements between the PA client in the mobile handset and the newly associated device by retrieving the ME framework parameters reported by the PA when the newly terminal device is discovered and associated.

The Media Server Control AS serves as a B2BUA and interacts with the originating UE as usual to establish the dialog. The Media Server Control AS interacts with the MRCF using a third party control model, as defined in IETF RFC 3264.

The Media Server Control AS requests trans-coding facilities from the MRCF (1720). The request includes the appropriate trans-coding requirements and resources to be established. A separate dialog is established from the Media Server Control AS to the MRCF for the PA client.

The offer/answer model is used for SDP negotiation between the Media Server Control AS/S-CSCF and the MRCF.

The MRCF should always grant the requests from the AS (unless there is a resource problem). The MRCF responds to the INVITE request (1721, 1722) with a 200 response indicating the selected codec in the SDP (1723, 1724). The MRCF will also reserve the requested local resources at that time.

The media from the PA UE is connected at the trans-coding resource at the Media Resource Function Processor (MRFP).

The selected codec is included by the Media Server Control AS in the 183 response to the UE. (not on Fig.)

The receipt of the ACK at the MRCF (1725, 1726) triggers the start of the trans-coding session (1727-1730).

It will be further appreciated that the scope of the present invention is not limited to the above-described embodiments but rather is defined by the appended claims, and that these claims will encompass modifications and improvements to what has been described.

What is claimed:

1. A method for a mobile device to act as a switch between a cellular network and a Personal Area Network (PAN) proximate to the mobile device, the method comprising:
the mobile device,
sensing one or more devices proximate to the mobile device;
creating the PAN for the one or more devices proximate to the mobile device using a local network;
creating a cellular network session;
using both the local network and the cellular network session, to provide a gateway between the cellular network and the one or more devices in the PAN; and
controlling the PAN for the one or more devices,
wherein, during the cellular network session, the mobile device is the only device visible to or directly addressable by the cellular network, and the one or more devices access the cellular network through the mobile device while the mobile device is configured to simultaneously maintain a voice call over a circuit switched network with which the mobile device communicates without use of any of the one or more devices as an intervening device, wherein the mobile device is configured to invite a Media server (MS) or an Application server (AS) into the session.

2. The method of claim 1, wherein the PAN allows the mobile device to discover other user endpoints in the PAN.

3. The method of claim 2, wherein the PAN comprises:
information broadcast from other mobile devices;
messages from other mobile devices;
polling and interrogating of other mobile devices;
RFID technologies; and
connections to other mobile devices through fixed links.

4. The method of claim 1, wherein the cellular network is unaware of the mobile device inviting the MS/AS into the session.

5. The method of claim 1, wherein the mobile device discovers a second mobile device within the PAN.

6. The method of claim 5, wherein the mobile device terminates a signaling protocol from the MS and the AS and starts a new signaling session with the second mobile device.

7. The method of claim 6, wherein the new signaling session comprises a different signaling protocol from the prior signaling protocol.

8. The method of claim 7, wherein the session initiated by the mobile device with the second mobile device may be terminated by the mobile device based on a user command or policy logic triggered by new sensory information becoming available to the mobile device via the PAN.

9. The method of claim 7, wherein the mobile device discovers a third mobile device in the PAN.

10. The method of claim 9, wherein the mobile device associates the third mobile device with a new session between the mobile device and the third mobile device, irrespective of the session between the mobile device and the second mobile device.

11. The method of claim 10, wherein the mobile device utilizes the third mobile device to render content from the MS/AS instead of the second mobile device.

12. The method of claim 7, wherein the mobile device negotiates capabilities with the additional mobile device.

13. The method of claim 12, wherein the mobile device requests the MS and a Media Resource Function (MRF) to provide content in a format suitable for the second mobile device.

14. The method of claim 13, wherein the mobile device re-formats the content received from the MS to a format that is suitable for the second mobile device and stores the re-formatted content in memory on the mobile device.

15. The method of claim 12, wherein an association of the second mobile device with the mobile device is not known to the network or the MS, and is known to the mobile device.

16. The method of claim 12, wherein, based on information from the negotiation with the second mobile device or from policy logic, the mobile device requests the MS/AS to re-format the content to meet the capabilities of the second mobile device.

17. The method of claim 12, wherein, based on information from the negotiation with the additional mobile device or from the policy logic, the mobile device re-formats said content and delivers it to the additional mobile device for rendering.

18. A mobile device configured to act as a switch in a session with a cellular network comprising:
a transceiver to communicate with the cellular network; and
logic stored in a non-transitory computer readable medium configured to perform the following functions:
sense one or more devices proximate to the mobile device;
create the PAN for the one or more devices proximate to the mobile device using a local network;
create a cellular network session;
use both the local network and the cellular network session, to provide a gateway between the cellular network and the one or more devices in the PAN; and
control the PAN for the one or more devices,
invite a Mediaserver (MS) or an Application server (AS) into the cellular network session,
wherein, during the cellular network session, the mobile device is the only device visible to or directly addressable by the cellular network, and the one or more devices access the cellular network through the mobile device while the mobile device simultaneously maintains a voice call over a circuit switched network with which the mobile device communicates without use of any of the one or more devices as an intervening device.

19. The mobile device of claim 18, wherein the PAN allows the mobile device to discover other user endpoints in the PAN.

20. The mobile device of claim 19, wherein the PAN comprises:
information broadcast from other mobile devices;
messages from other mobile devices;
polling and interrogating of other mobile devices;
RFID technologies; and
connections to other mobile devices through fixed links.

* * * * *